(12) United States Patent
Das Sharma

(10) Patent No.: US 12,219,038 B2
(45) Date of Patent: Feb. 4, 2025

(54) ALTERNATE PROTOCOL NEGOTIATION IN A HIGH PERFORMANCE INTERCONNECT

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/462,566

(22) Filed: Sep. 7, 2023

(65) Prior Publication Data

US 2024/0022653 A1    Jan. 18, 2024

Related U.S. Application Data

(63) Continuation of application No. 17/229,763, filed on Apr. 13, 2021, now Pat. No. 11,758,028, which is a continuation of application No. 15/721,487, filed on Sep. 29, 2017, now abandoned.

(60) Provisional application No. 62/505,612, filed on May 12, 2017.

(51) Int. Cl.
*H04L 69/24* (2022.01)
*G06F 13/42* (2006.01)

(52) U.S. Cl.
CPC .......... *H04L 69/24* (2013.01); *G06F 13/4295* (2013.01)

(58) Field of Classification Search
CPC ............................. H04L 69/24; G06F 13/4295
See application file for complete search history.

(56) References Cited

U.S. PATENT DOCUMENTS

| 7,426,597 | B1 * | 9/2008 | Tsu ..................... G06F 13/4018 |
| | | | 710/29 |
| 8,909,843 | B1 | 12/2014 | Choi |
| 10,387,339 | B2 | 8/2019 | Iyer et al. |
| 2003/0067939 | A1 | 4/2003 | Feuerstraeter et al. |
| 2004/0204912 | A1 | 10/2004 | Nejedlo et al. |

(Continued)

FOREIGN PATENT DOCUMENTS

WO    2013176951 A1    11/2013

OTHER PUBLICATIONS

International Preliminary Report on Patentability for Application No. PCT/US2018/032382, dated Nov. 12, 2019; 10 pages.

(Continued)

*Primary Examiner* — Henry Tsai
*Assistant Examiner* — Aurangzeb Hassan
(74) *Attorney, Agent, or Firm* — Alliance IP, LLC

(57) ABSTRACT

A port of a computing device is to communicate with another device over a link, the port including physical layer logic of a first protocol, link layer logic of each of a plurality of different protocols, and protocol negotiation logic to determine which of the plurality of different protocols to apply on the link. The protocol negotiation logic is to send and receive ordered sets in a configuration state of a link training state machine of the first protocol, where the ordered sets include an identifier of a particular one of the plurality of different protocols. The protocol negotiation logic is to determine from the ordered sets that a link layer of the particular protocol is to be applied on the link.

23 Claims, 19 Drawing Sheets

(56) References Cited

U.S. PATENT DOCUMENTS

| | | |
|---|---|---|
| 2005/0141661 A1 | 6/2005 | Renaud et al. |
| 2005/0270988 A1* | 12/2005 | DeHaemer ............... H04L 5/18 370/254 |
| 2006/0023633 A1* | 2/2006 | Caruk .................... G06F 1/325 370/242 |
| 2006/0078000 A1 | 4/2006 | Rinne et al. |
| 2010/0241001 A1 | 9/2010 | Palmeri et al. |
| 2010/0251001 A1* | 9/2010 | Drescher ............ G01R 31/3177 714/E11.155 |
| 2010/0315135 A1 | 12/2010 | Lai et al. |
| 2011/0113293 A1 | 5/2011 | Ikeda |
| 2011/0185103 A1 | 7/2011 | Evoy et al. |
| 2011/0208913 A1 | 8/2011 | Suzuki et al. |
| 2012/0191887 A1 | 7/2012 | Yamauchi et al. |
| 2013/0007489 A1 | 1/2013 | Unnikrishnan et al. |
| 2013/0114420 A1 | 5/2013 | Schoenborn et al. |
| 2013/0205053 A1 | 8/2013 | Harriman et al. |
| 2014/0036966 A1 | 2/2014 | Elliott |
| 2014/0101356 A1 | 4/2014 | Sonoda et al. |
| 2014/0108686 A1 | 4/2014 | Wagh et al. |
| 2014/0108697 A1 | 4/2014 | Wagh |
| 2015/0242227 A1 | 8/2015 | Nair |
| 2015/0261718 A1 | 9/2015 | Campbell et al. |
| 2015/0301970 A1* | 10/2015 | Armstead ........... G06F 13/4022 710/105 |
| 2016/0028537 A1 | 1/2016 | Erdogan et al. |
| 2016/0077761 A1 | 3/2016 | Stabrawa et al. |
| 2016/0092362 A1 | 3/2016 | Barron et al. |
| 2016/0183031 A1 | 6/2016 | Ranganathan |
| 2017/0019247 A1 | 1/2017 | Iyer et al. |
| 2017/0123987 A1 | 5/2017 | Cheng et al. |
| 2017/0160984 A1 | 6/2017 | Frank et al. |
| 2017/0199815 A1 | 7/2017 | Frank et al. |
| 2018/0293690 A1 | 10/2018 | Ray et al. |
| 2019/0347125 A1 | 11/2019 | Sankaran et al. |
| 2020/0192853 A1 | 6/2020 | Caruk et al. |

OTHER PUBLICATIONS

International Search Report and Written Opinion for Application No. PCT/US2018/032382, mailed on Dec. 4, 2018, 12 pages.

* cited by examiner

805

| Symbol No | Ordered Set (Format 1) |
|---|---|
| 0 | COM |
| 1 | Link Number |
| 2 | Lane Number |
| 3 | N_FTS |
| 4 | Data Rate Identifier |
| 5 | Training Control<br>Bit 0 – Hot Reset<br>Bit 1 – Disable Link<br>Bit 2 – Loopback<br>Bit 3 – Disable Scrambling<br>Bit 4 – Compliance Receive<br>Bits 5:6 – Reserved<br>Bit 7 – Alternate Protocol Support:<br>    1b indicates support for alternate protocols;<br>    0b indicates no support |
| 6 | D10.2 for Standard TS1<br>EQ TS1:<br>    Bit 2:0 – Rx preset Hint<br>    Bit 6:3 – Tx Preset<br>    Bit 7 – Set to 1b |
| 7 | D10.2 |
| 8 | D10.2 |
| 9 | D10.2 |
| 10 | D10.2 |
| 11 | D10.2 |
| 12 | D10.2 |
| 13 | D10.2 |
| 14 | D10.2 |
| 15 | D10.2 |

| Symbol No | Ordered Set (Format 2) |
|---|---|
| 0 | COM |
| 1 | Link Number |
| 2 | Lane Number |
| 3 | N_FTS |
| 4 | Data Rate Identifier |
| 5 | Training Control<br>Bit 0 – Hot Reset<br>Bit 1 – Disable Link<br>Bit 2 – Loopback<br>Bit 3 – Disable Scrambling<br>Bit 4 – Compliance Receive<br>Bits 5:6 – Reserved<br>Bit 7 = 1b |
| 6 | D10.2 for Standard TS1<br>EQ TS1:<br>    Bit 2:0 – Rx preset Hint<br>    Bit 6:3 – Tx Preset<br>    Bit 7 – Set to 1b |
| 7 | Bit 1:0 – Usage<br>    00b: Alternate Protocols<br>    01b, 10b: Reserved<br>    11b: Vendor Defined usage<br>Bit 15:2 – Alternate Protocol details if Usage = 00b<br>Else Reserved |
| 8 | |
| 9 | Vendor ID/Protocol ID : 16 bits |
| 10 | |
| 11 | Bit 31:0 – Proprietary allocation based on "Usage" field in Symbol 7 |
| 12 | |
| 13 | |
| 14 | |
| 15 | Bit 7:0 – Even Parity per Symbol for Symbols 7-14 |

*FIG. 8B*

| Symbol Number | Value | Description |
|---|---|---|
| 0 through (4*N − 1) where N can be 1 through 5 | AAh | SKP Symbol Symbol 0 is the SKP Ordered Set identifier |
| 4*N | 78h | SKP_END_CTL Symbol Signifies the end of the Control SKP Ordered Set after three more Symbols |
| 4*N+1 | 00-FFh | Bit 7: Data Parity Bit 6: First Retimer Data Parity Bit 5: Second Retimer Parity Bit [4:0]: Margin CRC [4:0] |
| 4*N+2  *1105* | 00-FFh | Bit 7: Margin Parity Bits [6:0]: |
| 4*N+3  *1110* | 00-FFh | |

| Symbol Number | Value | Description |
|---|---|---|
| 0 through (4*N – 1)<br>where N can be 1 through 5 | AAh | SKP Symbol<br>Symbol 0 is the SKP Ordered Set identifier |
| 4*N | 78h | SKP_END_CTL Symbol<br>Signifies the end of the Control SKP Ordered Set after three more Symbols |
| 4*N+1 | 00-FFh | Bit 7: Data Parity<br>Bit 6: First Retimer Data Parity<br>Bit 5: Second Retimer Parity<br>Bit [4:0]: Margin CRC [4:0] |
| 4*N+2<br>_1105_ | 00-FFh | Bit 7: Margin Parity<br>Bit 6: Usage Model = 0<br>Bits [5:3]: Margin Type = 101b (vendor defined)<br>Bits [2:0]: Receiver Number = 000b (Broadcast) |
| 4*N+3<br>_1110_ | 00-FFh | Bits [7:0]: Payload<br><br>(8 bit payload per control SKP OS carrying protocol details along with Vendor/Protocol ID. Multiple SKP OS sent over different lanes or time can work to convey this information) |

ALTERNATE PROTOCOL NEGOTIATION IN A HIGH PERFORMANCE INTERCONNECT

RELATED APPLICATIONS

This application is a continuation (and claims the benefit of priority under 35 U.S.C. § 120) of U.S. patent application Ser. No. 17/229,763, filed on Apr. 13, 2021, which is a continuation of U.S. patent application Ser. No. 15/721,487, filed on Sep. 29, 2017 and entitled ALTERNATE PROTOCOL NEGOTIATION IN A HIGH PERFORMANCE INTERCONNECT, which application claims benefit to U.S. Provisional Patent Application Ser. No. 62/505,612, filed on May 12, 2017. The disclosures of the prior applications are incorporated by reference herein in their entirety.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 8A illustrates a representation of a first modified ordered set.

FIG. 8B illustrates a representation of a second modified ordered set.

FIGS. 11A-11B are representations of an ordered set with a user definable message field.

DETAILED DESCRIPTION

Figure 1:
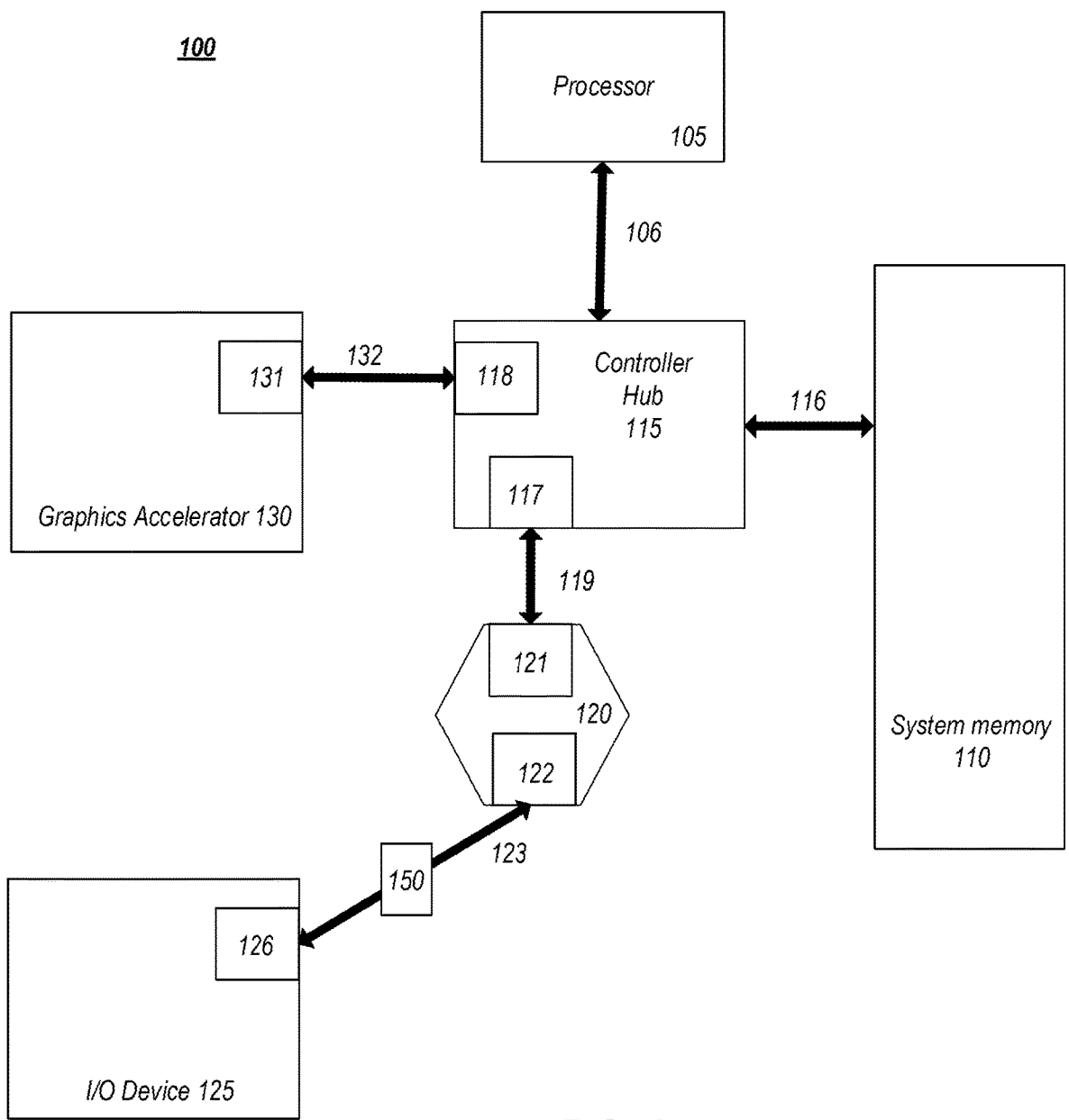
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
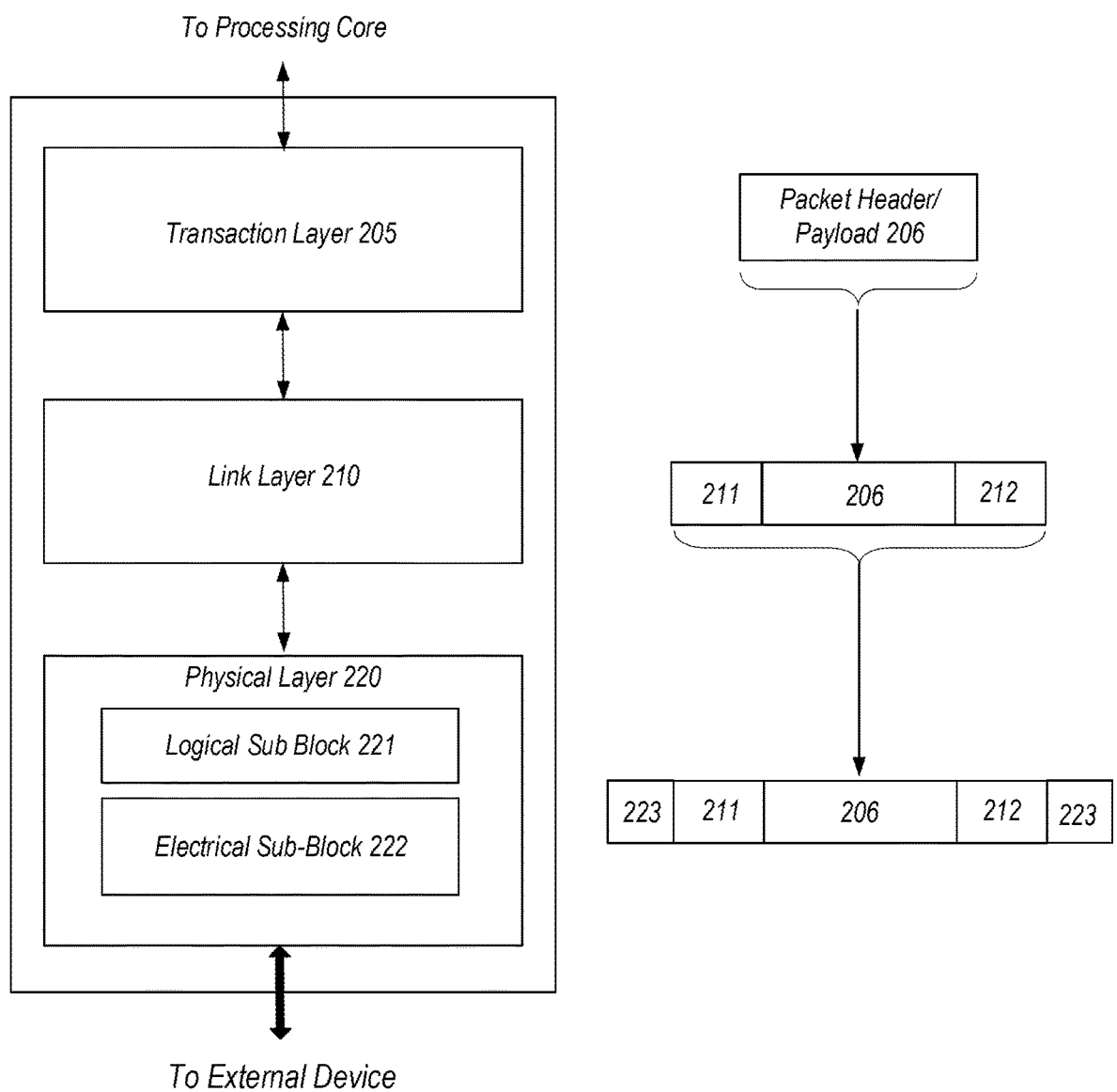
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
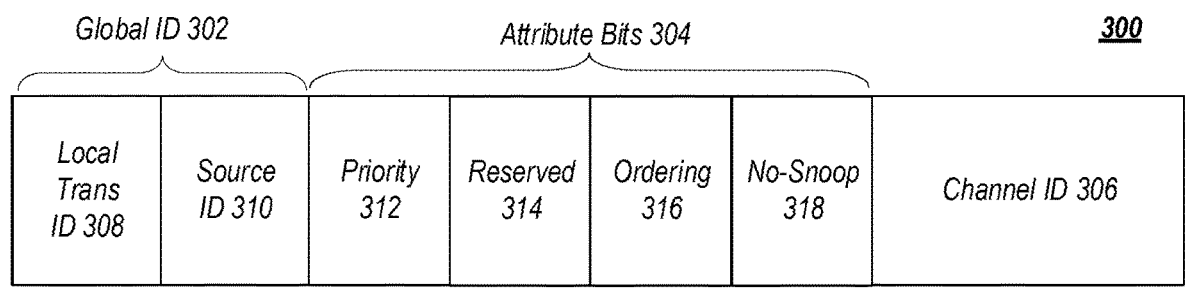
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8*b*/10*b* transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
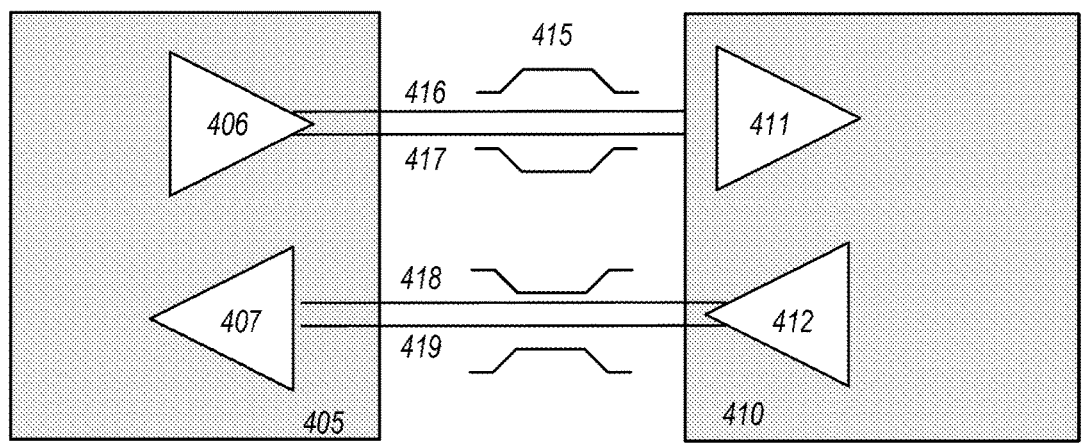
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Systems may be provided, which run various protocols over pins and physical layer (or PHY) defined according to another protocol. For instance, various non-PCIe protocols (e.g., Ethernet, Infiniband, Universal Serial Bus, and others known, future, and/or proprietary protocols) may be run on top of and using a PCIe physical layer (e.g., pins and logical PHY). Such implementations may be provided, for instance, to support a wide range of applications. Such applications may include, for instance, data center applications including accelerators with coherency and memory semantics, memory dis-aggregation and pooling with memory semantics, smart I/O devices, and field programmable array (FPGA)-based devices. The PHY, such as a PCIe PHY, may be selected and leveraged for other protocols (e.g., the higher-layers of these other protocol stacks including such higher layers as link layers, transaction layers, protocol layers, etc.) on the basis that the PHY offers the advantages of an established, widely adopted interconnect ecosystem including the abundance of low-power/low-latency intellectual property (IP) computing blocks and bus functional models (BFMs), backwards compatible speed upgrades to allow the ecosystem to evolve over time, a robust compliance program, a rich set of connector topologies (e.g., Card ElectroMechanical (CEM), SFF 8639, M.2, cable, etc.), variable widths, partitionable links for flexibility, well established channel model along with channel extenders such as retimers, among other example benefits. For instance, the PHY may facilitate the ability to offer the choice of either the native protocol (e.g., PCIe) or accelerator slot without over-provisioning pins on package or slots on board for dedicated proprietary protocols (e.g., versus) PCIe, which may cause potential customer confusion.

In some example systems, bus logic (e.g., implemented in circuitry (or other hardware), firmware, and/or software) may be provided, which implements a particular physical layer of a first protocol and the higher-level layers for multiple different protocols, which may each run on top of the physical layer of the first protocol. These multiple different protocols may include the first protocol, with the bus logic supporting the entire protocol stack of the first protocol. In one example, the bus logic may enable these multiple different protocols to be dynamically multiplexed over the common PHY.

Figure 5:
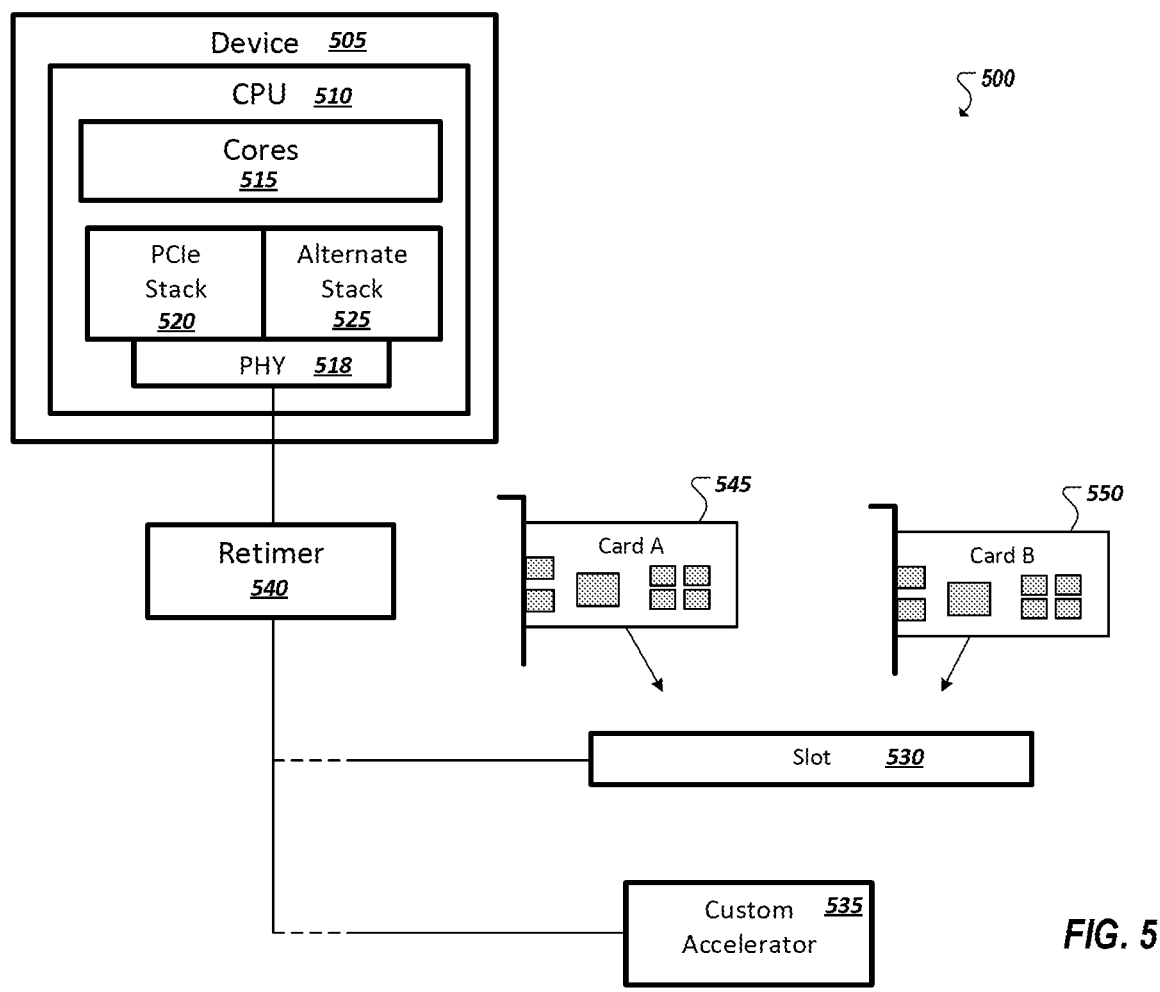
FIG. 5 illustrates a simplified block diagram of an example system.

In one implementation, the bus logic may utilize a PCIe PHY (e.g., PCIe Gen 5.0 PHY) and support not only native PCIe protocols but also one or more additional protocols (to run on the PCIe PHY), including coherency, memory, and I/O protocols, among other examples. For instance, as shown in the simplified block diagram 500 of FIG. 5, a device 505 may be provided that includes a processor 510 with one or more processor cores 515 and bus logic 518 to implement a common PHY (of a first protocol) on which two or more different higher level protocol stacks 520, 525, etc. (e.g., link layer and higher) may run. For instance, the common PHY may be implemented according to a base protocol, and one of the link protocol stacks (e.g., 520) may embody logic to implement the remaining layers of the base protocol. Additional link protocol stacks (e.g., 525) may be provided according to another, different protocol. Multiplexer logic (e.g., implemented in circuitry or other hardware-implemented logic) may be provided on the bus to select or activate one or more of the link protocol stack logic blocks 520, 525 (e.g., based on a protocol negotiation performed between the device 505 and other devices (e.g., 530, 535, 540, etc.) on the link. Additionally, in some cases, multiple link protocol stack logic blocks may be activated and used concurrently on the same link, with multiplexer logic being used to multiplex between the multiple protocols on the same lanes of the link, among other example features.

The device 505 may utilize ordered sets to negotiate protocols to be used on the link with one or more other devices (e.g., 530, 535, 540). For instance, a flexible connector or slot device 530 may be provided, which may be configured to accept multiple card devices (e.g., 545, 550), which may each support and implement an I/O interface and protocol stack block corresponding to a respective interconnect protocol. For instance, a first one of the devices 545 may support a first protocol (e.g., also supported by the device 505 and implemented using protocol stack block 520) and a second one of the devices 550 may support a second protocol (e.g., supported by the device and implemented using protocol stack block 525), etc. In other instances, a custom device 535, such as an accelerator device, may be provided, which itself possesses multiple protocol stack logic blocks to support communication using any one of multiple interconnect protocols (which may run on top of the PHY of a base protocol (e.g., PCIe)). Such custom devices may be connected via a soldered motherboard or other connection. Still further, extension devices, such as retimers, redrivers, and repeaters may be provided to extend the physical length of the link connecting two of the devices (e.g., 505 and 530 or 505 and 535, etc.). For instance, a retimer 540 may be provided and may itself implement at least partial protocol stack logic to enable the retimer 540 to participate (at least partially) in training of the link. Accordingly, in some instances, a retimer (e.g., 540) may be equipped with logic to consume some link training ordered sets, including those used in alternate protocol negotiation. In some implementations, the negotiation of the protocol(s) to be employed may be performed during initial PHY link training, using (or based on) the link training protocol of the PHY's protocol (e.g., PCIe), among other example implementations.

In some implementations, such as introduced above, a system supporting multiple different interconnect protocols to run on top of a PCIe PHY, may utilize initial PCIe link training to determine the protocols to support. For instance, in one example, protocol may be negotiated in an early generation (e.g., lower) data rate, such as a PCIe Gen1 data rate, during training with enhanced training sets (TSes) being used to communicate support protocols and perform handshaking to determine the protocols supported by the devices on the link (e.g., the two endpoint devices and any extension devices (e.g., retimers, redrivers, repeaters, etc.) provided between the two endpoints on the link. In another example, SKP ordered sets (OSes) (e.g., as defined in PCIe Gen 4.0) may be utilized to define and negotiate the protocol that is to be used, as the devices train the link. For instance, in systems supporting higher generation speeds (e.g., PCIe Gen 4.0) vendor defined fields defined within symbols of a control SKP OS may be used to perform protocol negotiation, among other example implementations. This negotiation may permit the dynamical selection and use of potentially one of many supported protocols (e.g., to be run top of a PCIe PHY), providing a system with more flexibility than approaches that define the protocol in an a priori manner (e.g., through a proprietary PCIe based register set by system software, etc.). Fixed protocol solutions, however, among other example considerations, may have limited utility in applications that are to provide an open slot, as fixed protocols may limit the usages to closed systems.

Figure 6:
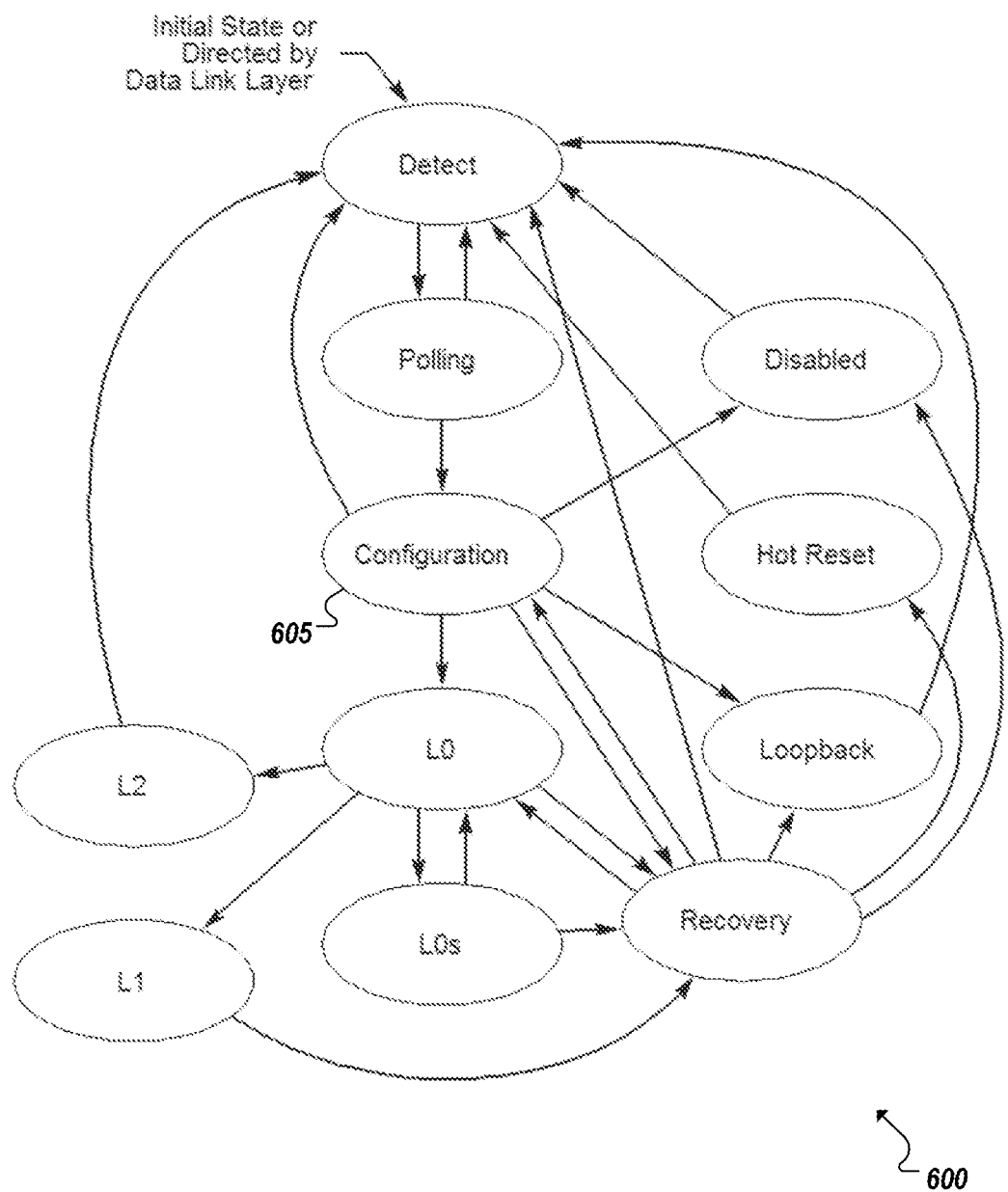
FIG. 6 is a diagram illustrating an example link training state machine.

Turning to the diagram 600 of FIG. 6, an example link training state machine is shown, such as the PCIe link training and status state machine (LTSSM). For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

In one example, such as illustrated in FIG. 6, a link training state machine 600 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0). In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 6, a configuration state (e.g., 605) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

Figure 7:
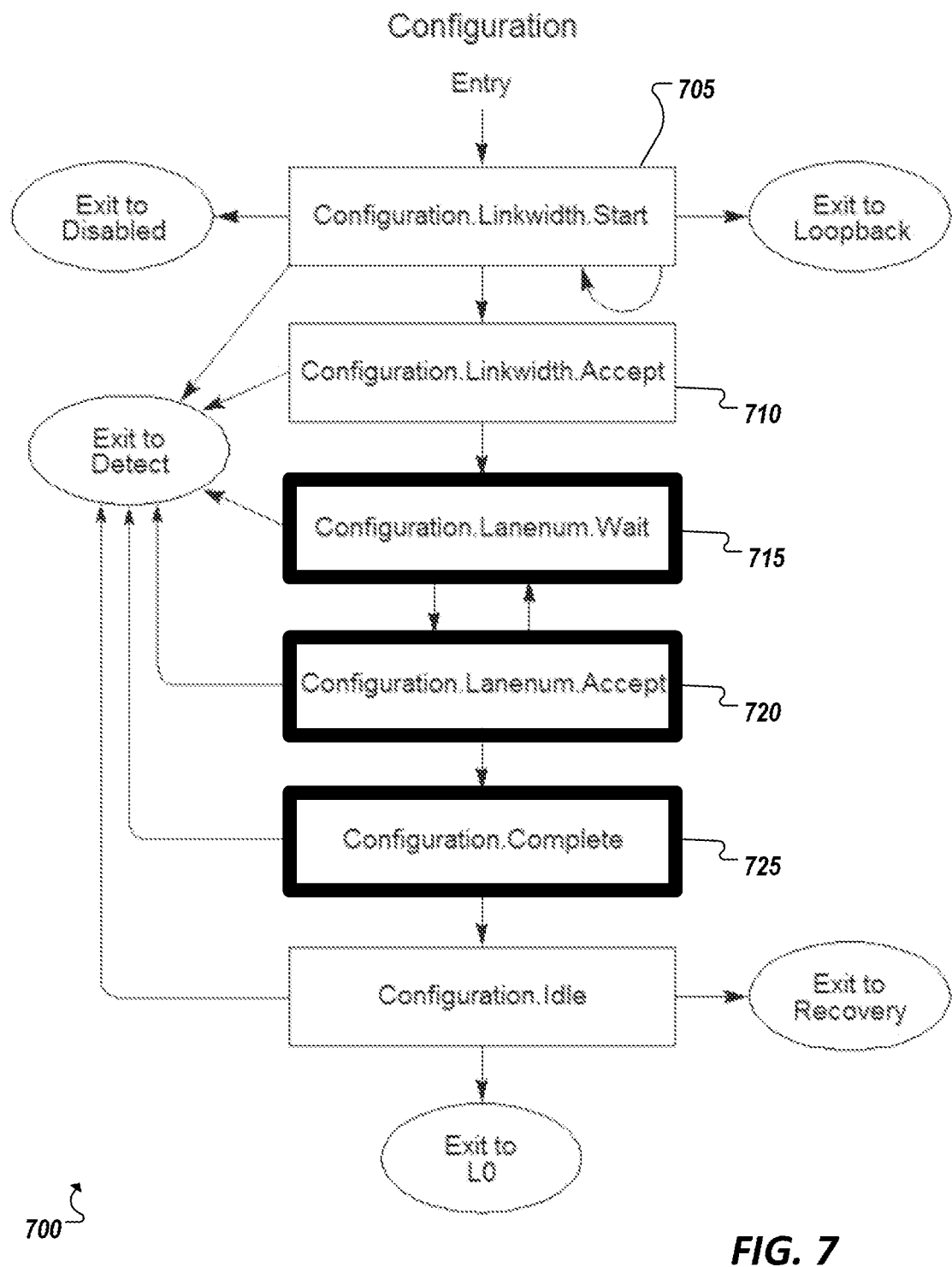
FIG. 7 is a diagram illustrating substrates in an example link training state machine.

For instance, as shown in FIG. 7, a diagram 700 is illustrated showing substrates of a PCIe Config state. In this example, a Configuration.Linkwidth.Start substrate 705 and a Configuration.Linkwidth.Accept substrate 710 may be provided in which the link width is configured. These substrates may involve the sending of training sequences, as would be conventionally accomplished during PCIe link training. Upon configuring the link width, additional substrates (e.g., 715, 720, 725, etc.) may be provided. One or more of these Config substrates may be used to enable multi-protocol negotiation. For instance, upon transitioning to one of Config substrates (e.g., 715, 720, 725) subsequent to configuration of the link width, an enhanced or modified training sequence may be introduced with fields or symbols configured for communicating protocol determination information. The physical layer logic of each of the devices may process the received information to determine the supported protocols of the participating devices prior to the conclusion of the configuration state (e.g., before the transitioning from the Configuration.Complete substrate 725), among other examples. This example may additionally allow such protocol negotiation to be facilitated in a backwards compatible way such that legacy or other devices, which do not support such functionality may be identified, and the communication tailored to the functionality of the other device, among other examples.

Turning to FIGS. 8A-8B, example training sequence ordered set formats are represented. For instance, FIGS. 8A-8B represent modified PCIe TS1 ordered sets in 8b/10b encoding. PCIe TS2 ordered sets may be modified in similar fashion. For instance, FIG. 8A shows a standard PCIe TS1 ordered set 805 augmented for use by the devices on a link to identify whether each of the devices supports alternate protocol negotiation. For instance, in this example, one or more bits may be provided and designated to be set to indicate whether the devices on the link support protocol negotiation (and by implication, each support multiple potential protocols, which may be run on the PHY). In one example, such illustrated in the example of FIG. 8A, a single bit (e.g., bit 7 in symbol 5 (810)) of the modified TS1 may be designated to indicate whether protocol negotiation is supported. For instance, a sending endpoint may support protocol negotiation and send the modified training sequence (e.g., 805) with the alternate protocol support bit set to "1". The training sequence may be received by the other endpoint device or an intermediate extension device (e.g., a retimer), which may flip the bit to "0" if it does not support protocol negotiation or keep the bit at "1" if it al so supports protocol negotiation. In some instances, if a device receives the training sequence and the alternate protocol support bit is "0", this can be interpreted by the receiving device that at least one device upstream on the link does not support protocol negotiation. In such cases, the receiving device may leave the alternate protocol support bit set to "0", even if the receive device support protocol negotiation. Accordingly, when the training sequence is eventually looped-back or returned from the downstream endpoint to the upstream endpoint (which originally sent the training sequence), if the alternate protocol support bit is still set, upon return, to "1" it can be concluded that all of the devices support protocol negotiation. If the alternate protocol support bit is set to "0", it can be concluded that at least one device (e.g., endpoint or extension device) does not support multi-protocol negotiation.

In another example implementation, a modified training sequence may be provided with multiple alternate protocol support bits, rather than having a single alternate protocol support bit that is to be used to collectively determine whether all devices on a link support protocol negotiation. For example, the multiple alternate protocol support bits may each correspond to a respective one of the devices (e.g., up to a maximum number of devices) on the link, such that each device may independently set one of the alternate protocol support bits to indicate whether it supports protocol negotiations, among other example implementations.

In the example of FIG. 8A, an example modified ordered set is shown, which has been modified to ensure interoperability between a native PCIe device and a device that implements the alternate protocol. Where one of the devices is a native PCIe device, the Link can still train to L0 at the highest supported data rate and operate PCIe protocol. In the particular example of FIG. 8A, an alternate protocol support bit (e.g., Bit 7 of Symbol 5) is used to indicate support for alternate protocol (among other potential usages (e.g., in different context, training states, etc.)). In this case, the alternate protocol support bit may be set to 1b denoting support for alternate protocols through the standard (and EQ) TS1 ordered sets in PCIe. In some implementations, the alternate protocol support bit may be a Reserved bit (e.g., as defined in a PCIe-based specification). In such instances, devices that do not implement this feature will ignore the bit (e.g., passing along the value of the bit as received) and not advertise the capability in the ordered sets they transmit during those configuration substrates, which are to be used to prepare for the negotiation of the protocol. For instance, in one example, the modified TS1 may be sent in the Configuration.Linkwidth.Start and Configuration.Linkwidth.Accept substrates to determine whether TSes augmented for protocol negotiation should be sent in the subsequent configuration substrates designated for protocol negotiation (e.g., Configuration.Lanenum.Wait, Configuration.Lanenum.Accept, and/or Configuration.Complete substrates). If protocol negotiation is not supported, the devices on the link will complete link training through the rest of Configuration state using standard TS1 ordered sets in the PCIe mode. However, if the devices on the link are capable of supporting alternate protocols (e.g., as determined through the handshake in the Configuration.Linkwidth.Start and Configuration.Linkwidth.Accept substrates using the example modified TS shown in FIG. 8A). they may proceed by exchanging modified ordered sets in a subsequent link training substrate, which include identification of the protocols supported by the communicating devices.

Turning to the example of FIG. 8B, if it is determined (e.g., based on the alternate protocol support bit of a first modified ordered set sent in a preceding link training state) that all of the devices on a link support protocol negotiation, upon entry into a designated link training state(s) or substrate(s) (e.g., Configuration.Lanenum.Wait, Configuration.Lanenum.Accept, or Configuration.Complete), a second modified ordered set may be utilized with fields designated to facilitate the protocol negotiation. If, however, it is determined that the alternate protocol support bit identifies that protocol negotiation is not supported, a standard (i.e., non-modified) version of the ordered set may instead be used during the designated link training state(s).

FIG. 8B illustrates one example of a second modified ordered set 815, which may be utilized in a substrates designated for facilitating protocol negotiation. Other link training activities (e.g., lane number or other link configuration tasks) may be performed in parallel with the protocol negotiation using the same modified ordered set. For instance, in this example, a modified PCIe TS1 is shown, where at least symbols 7-15 are modified to support protocol negotiation. For instance, in symbols 7-8, fields may be provided (e.g., in bits 1:0) to identify usage of the following symbols in the training sequence. To designate that these fields are to be used to facilitate protocol negotiation, a value 00b may be provided. Other codes may be utilized and defined to designate the symbols for other uses (i.e., other than protocol negotiation (e.g., when protocol negotiation is not supported by the devices on the link). In the case of protocol negotiation usage (e.g., as shown in FIG. 8B), symbols 9 and 10 may be used to encode a vendor identifier (e.g., to identify a company or other entity who created or owns the protocol) and/or protocol identifier (e.g., a 16 bit value) to identify a specific protocol or combination of protocols supported by a particular device. Other devices may encode their respective protocols in training sequences generated and sent by the device on the link during the designated configuration substrates. Additional bits may be utilized (e.g., in symbols 11-14 (e.g., up to 32 bits) to provide enable the devices on the link to communicate and coordinate additional information for negotiating the protocol(s) that are to be run on top of the PHY. Further, in this example, the final symbol may provide parity bits corresponding to the previous 8 symbols (e.g., symbols 7-14), among other example ordered set formats.

In implementations where the specialized ordered set (e.g., 815) is to be sent during one or more link training states or substrates, it may be assumed that the protocol negotiation conducted using the enhanced fields of the enhanced ordered set (e.g., 815) may complete before the other link training tasks (e.g., lane numbering) associated with these substrates complete. For instance, in one example, protocol negotiation may be completed so that by the time the lane number assignments are completed and the link is ready to move on to an active state (e.g., L0) the set of alternate protocols may be determined. In some cases, the determined protocols could be a set of two or more different protocols (e.g., including the native protocol of the PHY (e.g., PCIe)), which may be dynamically multiplexed over the same physical link. By identifying the set of protocols to be run on the link, it may also be determined what the target maximum data rate may be (i.e., which can be supported by each of the potentially multiple protocols). For instance, each device may advertise the data rates (or the maximum data rate) it supports during link training (e.g., during a configuration link width substrate), from which the devices may identify the highest mutually supported data rate for the link. Link training states/substrates used for alternate protocol negotiation are states following those link training states used to determine the maximum data rate supported on the link. Further, as noted in the example above, in the case of a PCIe PHY, a modified TS1 (and/or TS2) ordered set may be defined to contain all the details needed for this handshake, while still preserving the essential information exchanged in the TS1 ordered sets in the first 7 symbols (e.g., for use in the native configuration substrates).

Figure 9:
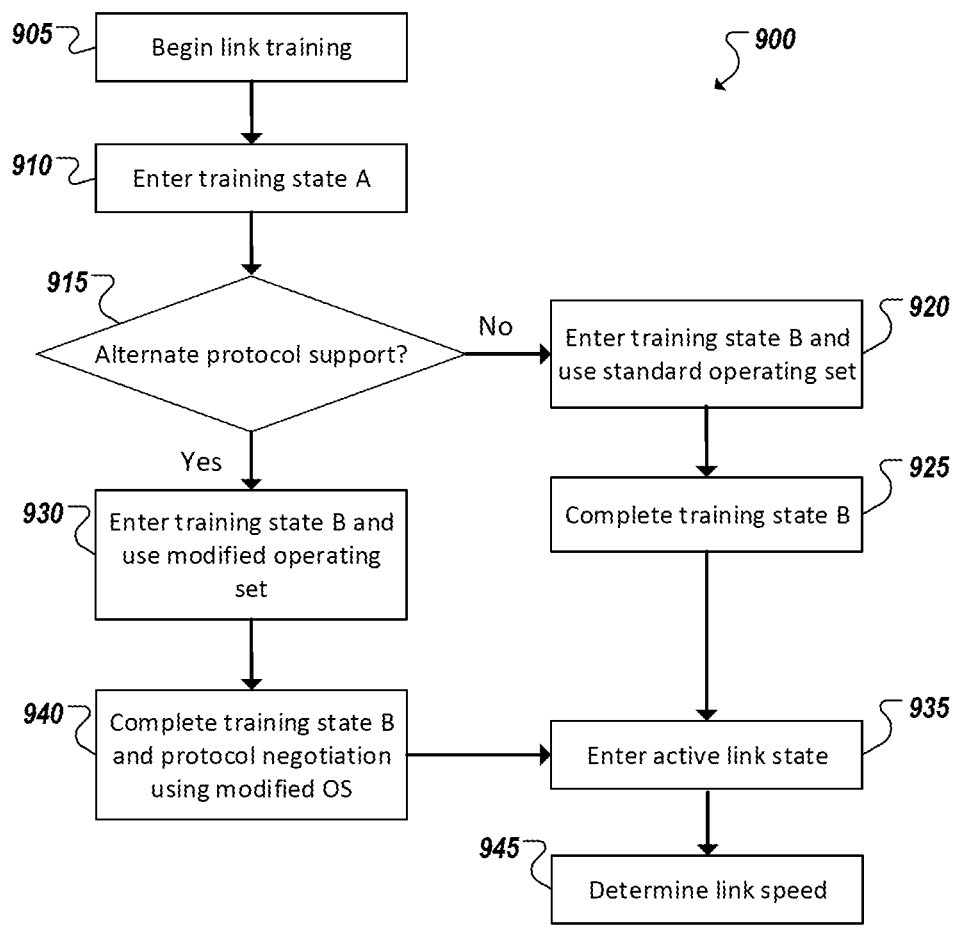
FIGS. 9-10 are flowcharts illustrating example techniques for negotiating protocols for a link.

Turning to FIG. 9, a simplified flowchart is shown illustrating an example technique to facilitate the negotiation of an alternate protocol in a system involving devices supporting such protocols. The protocol negotiation may take place using ordered set communicated on the lanes of the link during link training Like training may begin 905 and involve multiple link training states. One link training state (e.g., a state or substrate "A") may be entered 910, in which ordered sets are provided to not only facilitate the traditional purpose of the state (e.g., lane width determination), but also to allow the devices on the link to communicate whether or not they support alternate protocol negotiation (e.g., by supporting two or more alternate protocols, which may each run on top of the same PHY). One or more fields may be provided in the ordered sets communicating during state A, which may be encoded to indicate whether each of the devices on the link supports protocol negotiation. From these fields, it may be determined (at 915) whether or not the devices are capable of participating together in protocol negotiation (e.g., based on whether all of the devices support protocol negotiation or not). If protocol negotiation is not supported, the training state A may end and the devices may progress (e.g., at 920) to subsequent link training states defined in a state machine, such as a state B, which is capable of also being used to support protocol negotiation (e.g., in addition to the link training activities traditionally defined for the link state). Based on whether the protocol negotiation is supported, a standard version or a modified version of a state B ordered set may be used. When protocol negotiation is not supported, the standard version of the ordered set may be used and communicated between devices on the link to facilitate and complete (e.g., 925) a traditional implementation of state B. In cases where protocol negotiation is supported, the same training state (e.g., state B) may be entered (e.g., at 930), but a modified version of the ordered set (e.g., the training sequence ordered set shown in FIG. 8B) may be used, which includes fields to be encoded by the devices on the link with protocol identifiers and other information, which may be for used to communicate the respective protocols supported by the devices and determine which of these protocols may be utilized when the link is active (e.g., 935). Link training steps of state B may also be completed (e.g., 940) along with the negotiation of alternate protocols. Completion of these (and potentially other, additional) link training states may allow the link to be brought up to an active state 935. In some cases, a link may support one of many data rates. Based on the set of (one or more) protocols supported by the devices on the link, a maximum operating speed for the link may be determined 945, as a data rate which is supported by each of the set of protocols, among other example techniques and features.

While examples above illustrate the use of modified PCIe training sequences to facilitate protocol negotiation on a link capable of supporting one or more protocols over the same PHY, other examples may utilize other (i.e., non-PCIe) protocols and other ordered sets to accomplish protocol negotiation. For instance, as another example, a SKP ordered set may be used to perform handshaking and communication of supported protocols by devices on a link. For instance, a PCIe control SKP ordered set (e.g., with 128b/130b encoding) may be used, which is defined for higher generation data rates (e.g., data rates of 16.0 GT/s data rate or above). In such examples, the SKP OS may be provided with a set of definable fields, which may be utilized to perform protocol negotiation. For instance, one implementation of a Control SKP Ordered Set may include a vendor-defined messaging mechanism is already defined. Such implementations may be beneficial, as providing such definable fields within a standardized ordered set may, among other example benefits, mitigate any risk of a non-compliant but otherwise perfectly interoperating legacy device misinterpreting modified ordered sets used in examples where modified ordered sets are used to perform protocol negotiation (such as in the preceding example illustrated in FIGS. 8A-9. Utilizing customizable fields defined in a standardized ordered set may also have the advantage of leveraging the existing infrastructure without defining a new ordered set (although support for a specific generation (e.g., Gen 4) of the underlying protocol (e.g., PCIe) may be a prerequisite for the use of such ordered sets (e.g., SKP OSes), potentially limiting the utility of such approaches, among other example considerations.

In one example, the Vendor Defined message fields defined within a PCIe Control SKP Ordered Set may be utilized to negotiate the alternate protocols (e.g., when the Link is in the Recovery state at 16.0 GT/s Data Rate (or higher) after completing the Equalization handshake in that data rate). In this particular example, 8 bits may be provided in the Vendor Defined message field per SKP Ordered Set as payload. Accordingly, in such instances four of these Control SKP Ordered Sets may be sent (e.g., in adjacent lanes (e.g., Lanes 0-3) with the rest of the Lanes repeating the same information for redundancy or in multiple Control SKP Ordered Sets over time) to convey 32 bits of protocol information. For example, 16 of these 32 can be the Vendor ID/Protocol ID and the remaining 16 bits can have the protocol details to determine the policy of running alternate protocols, among other example implementations.

Figure 10:
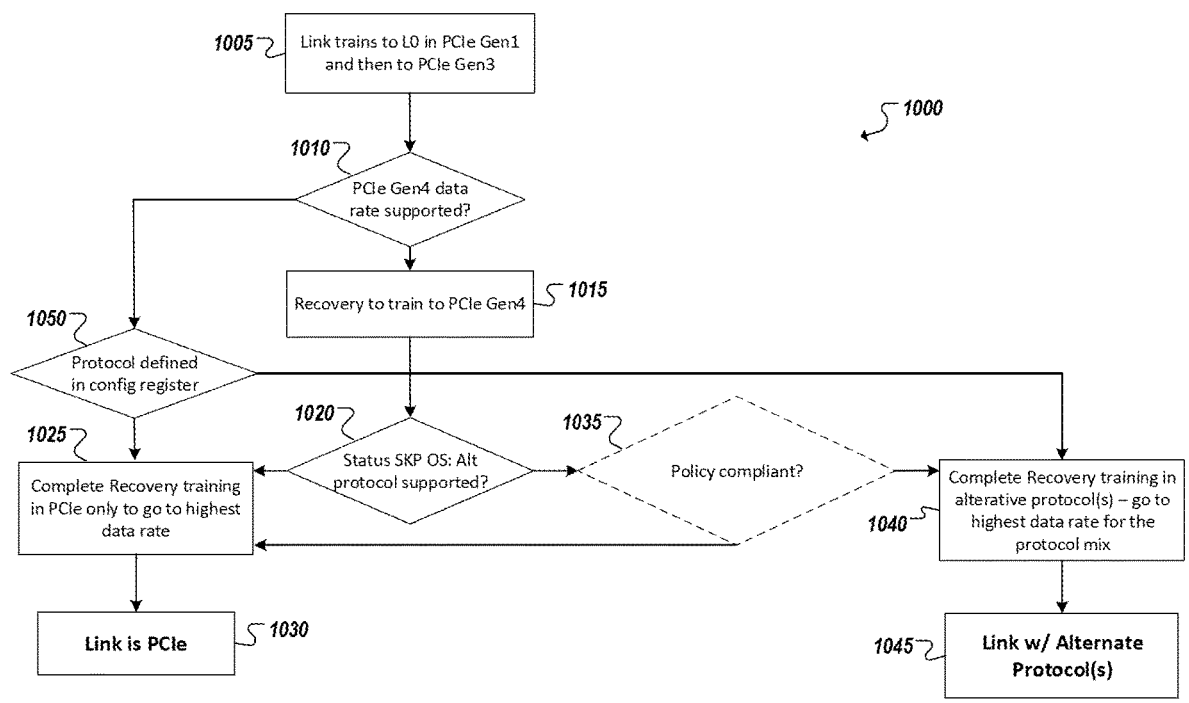

Turning to the flowchart 1000 shown in FIG. 10, an example technique is shown to utilize a user-definable field, such as a Vendor Defined message field of a SKP OS, to facilitate protocol negotiation between devices on a link. In the particular example illustrated in FIG. 10, an alternate protocol may be negotiated using the Control SKP OS mechanism described above for an open slot connectivity, while still maintaining a system software-based mechanism for a closed system. Further, in some cases, in addition to support for alternate protocol, policies may be adopted (e.g., client vs server profile) before the alternate protocol is chosen. For instance, a link may be trained (e.g., according to a PCIe-based LTSSM) to bring the link to an active state. The training may be initially used to bring the link up (at 1005) to the lowest defined data rate for the link (e.g., to train the link to L0 in PCIe Gen1 speed). The link may then progress to then bring the link up to a higher generation implementation of the link (e.g., PCIe Gen3), which may be the implementation below the particular implementation (e.g., PCIe Gen4) that supports the user definable field (e.g., a Vendor Defined message within a PCIe SKP OS). It may be determined (at 1010) whether this particular implementation is also supported by the devices on the link. If this implementation or mode is supported, the devices may proceed to enter a Recovery state to train the link up to this next mode or generation, which may involve equalizing the link to support a higher data rate.

With the link in this particular implementation or mode, the specialized ordered sets containing the user definable field, in this case PCIe SKP OSes, may be sent. The devices may populate this field to indicate whether or not they each support alternate protocol negotiation. If one or more devices on the link fail to support the alternate protocols (e.g., beyond PCIe), as determined at 1020, the devices may complete Recovery training 1025 in the base protocol only (e.g., the protocol of the PHY whereon the alternate protocol would be run, in this case PCIe) to bring the link into an active, transmitting state in the base protocol and only using base protocol stack logic. For instance, one of the device may possess multiple link protocol stacks, but may only use more than one of these logic blocks if alternate protocol negotiation is determined (at 1020) to be supported for the link.

Where the Vendor Defined message fields of the SKP OSes (or another ordered sets) indicates that alternate protocols are supported by the devices on the link, the Vendor Defined message fields (or other user definable fields) may be utilized by the devices (as the ordered set are generated and transmitted between the devices) to identify the set of protocols supported by the devices. Additionally, in some implementations, it may be determined (at 1035) whether there are policies applicable to the link, which may affect the protocols which are to be used on the link. In some cases, if it is determined that a particular policy applies, it may cause the alternate protocols to be overridden, such that the link is trained to only support the base protocol. For instance, a policy may require that the respective profiles of the devices on the link are compatible or match (e.g., CPU and device profiles), where the profiles correspond to the respective capabilities of the devices, among other example policies. If the alternate protocols are allowed, Recovery training may be completed to implement the set of one or more alternate protocols negotiated (e.g., at 1020) between the devices. Based on the set of negotiated protocol, the highest data rate supported by the each of the collection of selected protocols may be determined and applied to the link, as it is brought to active and supporting the one or more alternate protocols (at 1045).

In some cases, alternate protocols may be supported, even in cases where the link does not support a next generation mode in which a particular user definable field is defined in corresponding ordered set (e.g., in PCIe Gen3). For instance, it may be determined (at 1010) that the next generation mode (e.g., PCIe Gen4) is not supported. However, before implementing the link with the base protocol only (e.g., PCIe (at 1025, 1030)), it may be determined 1050 whether system software (or other machine implemented logic) has designated support of one or more alternate protocols for use on the link (e.g., as written to a corresponding configuration and status register (CSR)). In such cases, the protocol designation made in the CSR may govern, and cause the link to be trained (at 1040) to support the designated alternate protocol mix. If no such designation or mechanism is provided, however, training may proceed to implement (e.g., at 1025, 1030) the link using the base protocol (and corresponding stack logic) accordingly. It should be appreciated, that even though the discussion of the example of FIG. 10 makes reference to PCIe and Control SKP OS, other implementations may utilize other base protocols and/or other ordered sets and ordered set fields (e.g., beyond SKP OSes or modified TS1s and TS2s, such as in some of the examples discussed above), among other examples. Further, it should be appreciated that CSR-defined alternate protocols or link policies overriding alternate protocols may also be applied in implementations relying on modified training sequences (e.g., as in the examples of FIGS. 6-9) to facilitate protocol negotiation, among other examples.

Turning to FIG. 11A, a table 1100a is presented representing an example PCIe-based Control SKP OS, in accordance with some implementations. In this example, symbols numbered 4*N+2 may be defined to include bits (e.g., Bits [6:0]), which may be used to designate the use of a Vendor Defined message. Turning to FIG. 11B, a table 1100b is shown illustrating one example implementation of a Vendor Defined message which may be provided to facilitate alternate protocol negotiation. The Vendor Defined message may be potentially used for a variety of different purposes, including alternate protocol negotiation. In this example, in symbols numbered 4*N+2 (1105) may include a bit 6, which designates a usage model that, in combination with an encoding in bits [5:3] can be interpreted by a device to indicate that the following symbol 1110 (e.g., numbered 4*N+3) is encoded with vendor-defined information. Further, symbols numbered 4*N+2 may include bits [2:0] to indicate an intended recipient device for the vendor-defined information. For instance, particular receiver identifier, or number, may be encoded to identify that the message is for consumption by the particular receiver. In other instances, the field (e.g., in bits [2:0]) may identify multiple or all of the devices on a link (e.g., through a broadcast code, as in the example of FIG. 11B, to indicate that the message is for consumption by all devices on the link), among other examples. The symbol numbered 4*N+3 (1110) may serve as the payload for the message and may contain user- or vendor-defined encodings, including encodings to identify support for alternate protocol negotiation and identification and negotiation of particular alternate protocols, which may be applied on the link (e.g., based on the corresponding protocol stack logic blocks on each of the devices on the link), among other example uses and features.

As introduced above, in some implementations, a link, such as a PCIe-compliant link, can include one or more retimers or other extension devices, such as a repeater. A retimer device (or simply "retimer"), can include active electronic devices that receive and re-transmit (retime) digital I/O signals. Re-timers can be used to extend the length of a channel that can be used with a digital I/O bus. Retimers can be protocol aware, software transparent, and capable of executing a link equalization procedure, such as the link equalization procedure of PCIe. A link incorporating one or more retimers can form two or more separate electrical sub-links at data rates comparable to data rates realized by links employing similar protocols but with no retimers. For instance, a link including a single retimer can form a link with two separate sub-links, each operating at a speed, such as speeds of 8 GT/s, 16 GT/s, 25 GT/s, 32.0 GT/s, or higher.

Figures 12A, 12B:
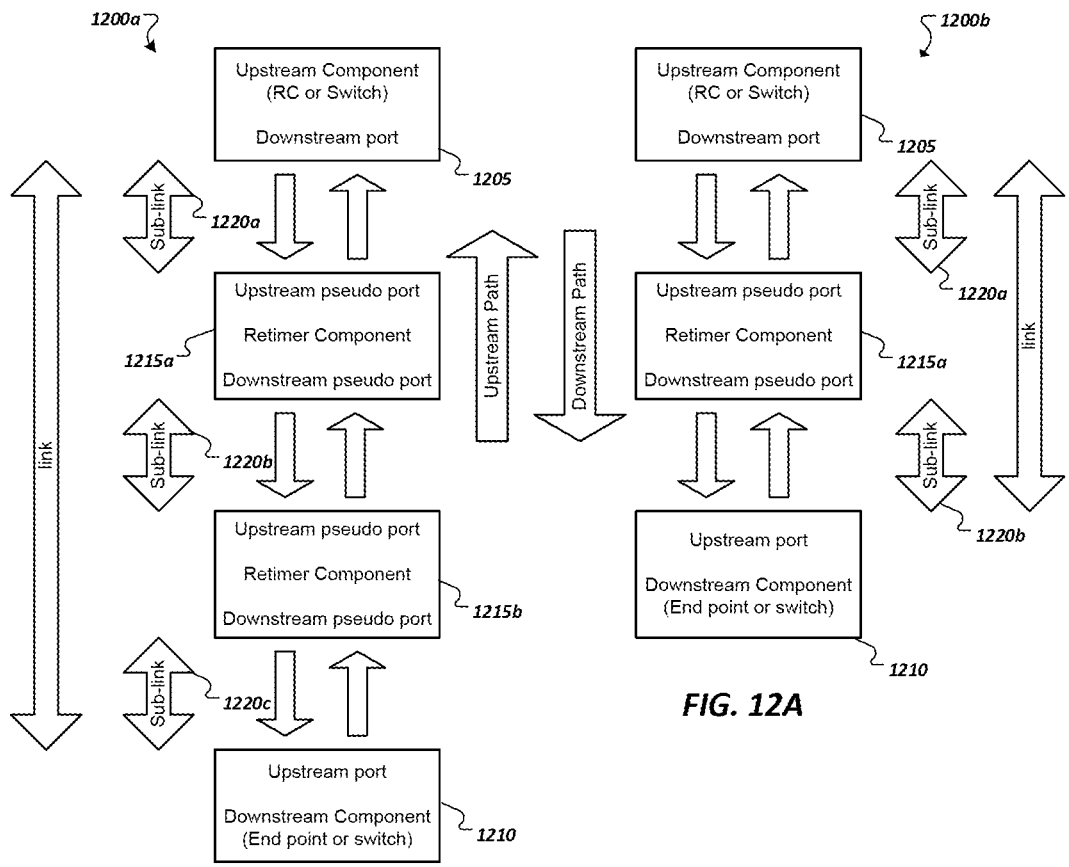
FIGS. 12A-12B illustrate simplified block diagrams of example links including one or more extension devices.

FIGS. 12A-12B illustrate simplified block diagrams 1200a-b of example links including one or more retimers. For instance, in FIG. 12A, a link connecting a first component 1205 (e.g., an upstream component) to a second component 1210 (e.g., a downstream component) can include a single retimer 1215a. A first sublink 1220a can connect the first component 1205 to the retimer 1215a and a second sublink 1220b can connect the retimer 1215a to the second component. As shown in FIG. 12B, multiple retimers 1215a, 1215b can be utilized to extend a link. Three sublinks 1220a-c can be defined through the two retimers 1215a, 1215b, with a first sublink 1215a connecting the first component to the first retimer 1215a, a second sublink connecting the first retimer 1215a to the second retimer 1215b, and the third sublink 1215c connecting the second retimer 1215b to the second component.

As shown in the examples of FIGS. 12A-12B, a retimer can include two pseudo ports, and the pseudo ports can determine their respective downstream/upstream orientation dynamically. Each retimer 1215a, 1215b can have an upstream path and a downstream path. Further, retimers 1215a, 1215b can support operating modes including a forwarding mode and an executing mode. A retimer 1215a, 1215b in some instances can decode data received on the sublink and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

In some implementations, an interconnect may be defined to support a maximum number of extension devices, such as retimers. For instance, an earlier generation of the interconnect may support a first number of extension devices (e.g., 1 or 2 retimers on a link connecting two end devices), while a later generation of the interconnect (e.g., the high performance interconnect discussed above) may support a larger number of extension device (e.g., 4 or more retimers). To preserve backward compatibility, the later generation of the interconnect may natively support the protocols and training adapted for links where a first number of retimers (or redrivers) are on the link, but may also provide logic for end devices, which support the newer generation of the interconnect, to handle the larger permitted number of retimers. Additionally, a retimer may be equipped with protocol logic to support multiple alternate protocols. Further, a retimer may likewise include logic to participate in alternate protocol negotiation (along with other devices (e.g., 1205, 1210)) to allow a determination to be made regarding whether alternate protocols are supported by the devices (e.g., 1205, 1210, 1215a-b, etc.) on the link, and also which sets of protocol are supported, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
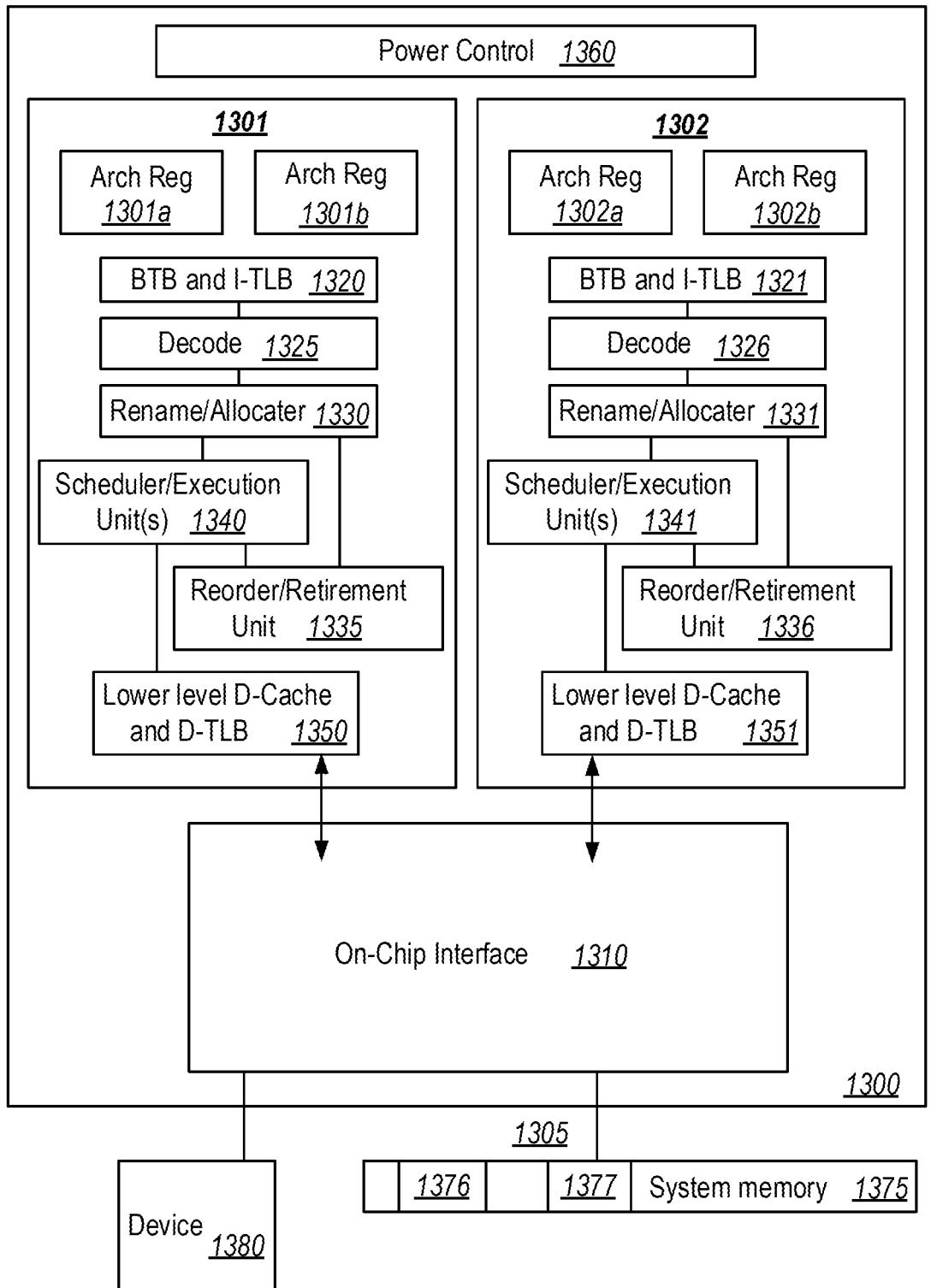
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b. Here, each of the architecture state registers (1301a, 1301b, 1302a, and 1302b) may be referred to as processing elements, thread slots, or thread units, as described above. As illustrated, architecture state registers 1301a are replicated in architecture state registers 1301b, so individual architecture states/contexts are capable of being stored for logical processor 1301a and logical processor 1301b. In core 1301, other smaller resources, such as instruction pointers and renaming logic in allocator and renamer block 1330 may also be replicated for threads 1301a and 1301b. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301a, 1301b, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301a and 1301b are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
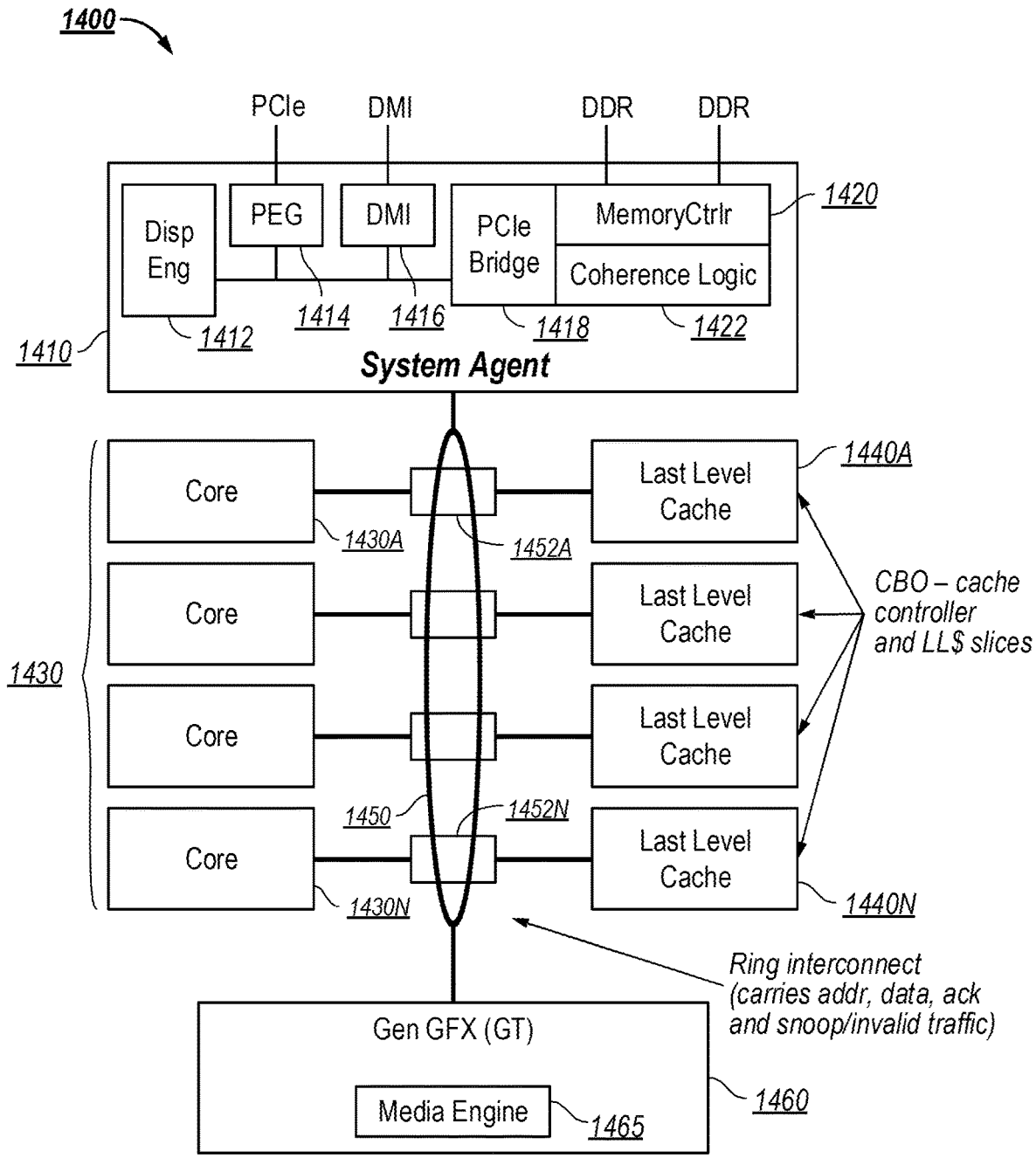
FIG. 14 illustrates another embodiment of a block diagram for a computing system including a multicore processor.

Referring now to FIG. 14, shown is a block diagram of an embodiment of a multicore processor. As shown in the embodiment of FIG. 14, processor 1400 includes multiple domains. Specifically, a core domain 1430 includes a plurality of cores 1430A-1430N, a graphics domain 1460 includes one or more graphics engines having a media engine 1465, and a system agent domain 1410.

In various embodiments, system agent domain 1410 handles power control events and power management, such that individual units of domains 1430 and 1460 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1430 and 1460 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1430 further includes low level caches in addition to various execution units and additional processing elements. Here, the various cores are coupled to each other and to a shared cache memory that is formed of a plurality of units or slices of a last level cache (LLC) 1440A-1440N; these LLCs often include storage and cache controller functionality and are shared amongst the cores, as well as potentially among the graphics engine too.

As seen, a ring interconnect 1450 couples the cores together, and provides interconnection between the core domain 1430, graphics domain 1460 and system agent circuitry 1410, via a plurality of ring stops 1452A-1452N, each at a coupling between a core and LLC slice. As seen in FIG. 14, interconnect 1450 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1410 includes display engine 1412 which is to provide control of and an interface to an associated display. System agent domain 1410 may include other units, such as: an integrated memory controller 1420 that provides for an interface to a system memory (e.g., a DRAM implemented with multiple DIMMs; coherence logic 1422 to perform memory coherence operations. Multiple interfaces may be present to enable interconnection between the processor and other circuitry. For example, in one embodiment at least one direct media interface (DMI) 1416 interface is provided as well as one or more PCIe™ interfaces 1414. The display engine and these interfaces typically couple to memory via a PCIe™ bridge 1418. Still further, to provide for communications between other agents, such as additional processors or other circuitry, one or more other interfaces may be provided.

Figure 15:
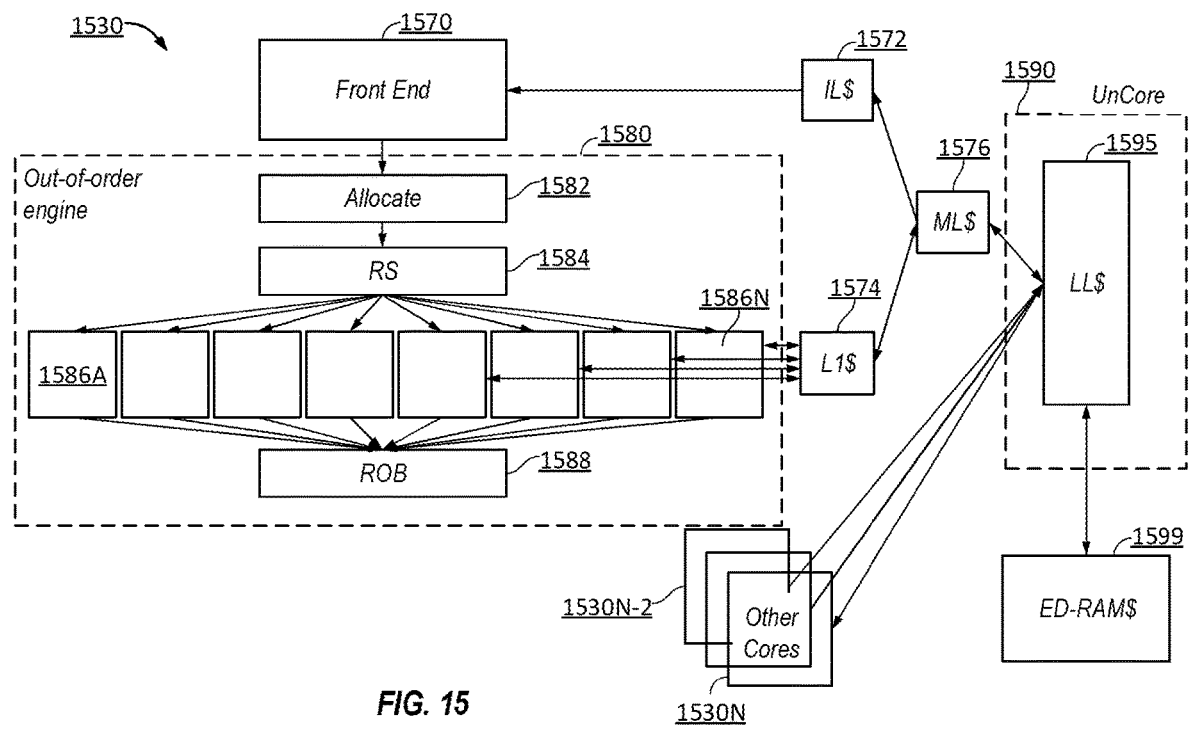
FIG. 15 illustrates an embodiment of a block diagram for a processor.

Referring now to FIG. 15, shown is a block diagram of a representative core; specifically, logical blocks of a back-end of a core, such as core 1430 from FIG. 14. In general, the structure shown in FIG. 15 includes an out-of-order processor that has a front end unit 1570 used to fetch incoming instructions, perform various processing (e.g. caching, decoding, branch predicting, etc.) and passing instructions/operations along to an out-of-order (OOO) engine 1580. OOO engine 1580 performs further processing on decoded instructions.

Specifically in the embodiment of FIG. 15, out-of-order engine 1580 includes an allocate unit 1582 to receive decoded instructions, which may be in the form of one or more micro-instructions or uops, from front end unit 1570, and allocate them to appropriate resources such as registers and so forth. Next, the instructions are provided to a reservation station 1584, which reserves resources and schedules them for execution on one of a plurality of execution units 1586A-1486N. Various types of execution units may be present, including, for example, arithmetic logic units (ALUs), load and store units, vector processing units (VPUs), floating point execution units, among others. Results from these different execution units are provided to a reorder buffer (ROB) 1588, which take unordered results and return them to correct program order.

Still referring to FIG. 15, note that both front end unit 1570 and out-of-order engine 1580 are coupled to different levels of a memory hierarchy. Specifically shown is an instruction level cache 1572, that in turn couples to a mid-level cache 1576, that in turn couples to a last level cache 1595. In one embodiment, last level cache 1595 is implemented in an on-chip (sometimes referred to as uncore) unit 1590. As an example, unit 1590 is similar to system agent 1310 of FIG. 13. As discussed above, uncore 1590 communicates with system memory 1599, which, in the illustrated embodiment, is implemented via ED RAM. Note also that the various execution units 1586 within out-of-order engine 1580 are in communication with a first level cache 1574 that also is in communication with mid-level cache 1576. Note also that additional cores 1530N-2-1530N can couple to LLC 1595. Although shown at this high level in the embodiment of FIG. 15, understand that various alterations and additional components may be present.

Figure 16:
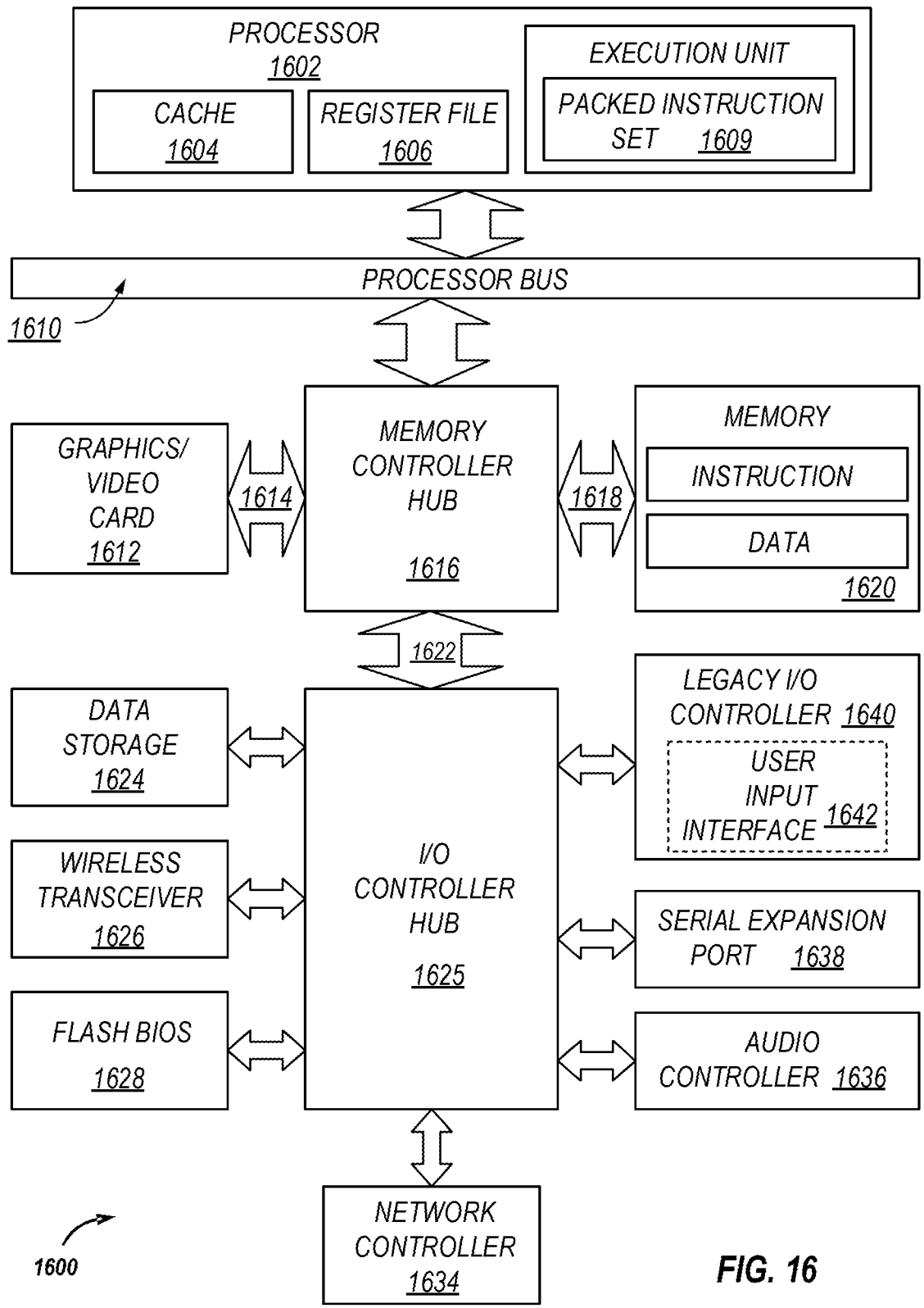
FIG. 16 illustrates another embodiment of a block diagram for a computing system including a processor.

Turning to FIG. 16, a block diagram of an exemplary computer system formed with a processor that includes execution units to execute an instruction, where one or more of the interconnects implement one or more features in accordance with one embodiment of the present invention is illustrated. System 1600 includes a component, such as a processor 1602 to employ execution units including logic to perform algorithms for process data, in accordance with the present invention, such as in the embodiment described herein. System 1600 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1600 executes a version of the WINDOWS™ operating system available from Microsoft Corporation of Redmond, Washington, although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1602 includes one or more execution units 1608 to implement an algorithm that is to perform at least one instruction. One embodiment may be described in the context of a single processor desktop or server system, but alternative embodiments may be included in a multiprocessor system. System 1600 is an example of a 'hub' system architecture. The computer system 1600 includes a processor 1602 to process data signals. The processor 1602, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1602 is coupled to a processor bus 1610 that transmits data signals between the processor 1602 and other components in the system 1600. The elements of system 1600 (e.g. graphics accelerator 1612, memory controller hub 1616, memory 1620, I/O controller hub 1625, wireless transceiver 1626, Flash BIOS 1628, Network controller 1634, Audio controller 1636, Serial expansion port 1638, I/O controller 1640, etc.) perform their conventional functions that are well known to those familiar with the art.

In one embodiment, the processor 1602 includes a Level 1 (L1) internal cache memory 1604. Depending on the architecture, the processor 1602 may have a single internal cache or multiple levels of internal caches. Other embodiments include a combination of both internal and external caches depending on the particular implementation and needs. Register file 1606 is to store different types of data in various registers including integer registers, floating point registers, vector registers, banked registers, shadow registers, checkpoint registers, status registers, and instruction pointer register.

Execution unit 1608, including logic to perform integer and floating point operations, also resides in the processor 1602. The processor 1602, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1602. For one embodiment, execution unit 1608 includes logic to handle a packed instruction set 1609. By including the packed instruction set 1609 in the instruction set of a general-purpose processor 1602, along with associated circuitry to execute the instructions, the operations used by many multimedia applications may be performed using packed data in a general-purpose processor 1602. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1608 may also be used in micro controllers, embedded processors, graphics devices, DSPs, and other types of logic circuits. System 1600 includes a memory 1620. Memory 1620 includes a dynamic random access memory (DRAM) device, a static random access memory (SRAM) device, flash memory device, or other memory device. Memory 1620 stores instructions and/or data represented by data signals that are to be executed by the processor 1602.

Note that any of the aforementioned features or aspects of the invention may be utilized on one or more interconnect illustrated in FIG. 16. For example, an on-die interconnect (ODI), which is not shown, for coupling internal units of processor 1602 implements one or more aspects of the invention described above. Or the invention is associated with a processor bus 1610 (e.g. other known high performance computing interconnect), a high bandwidth memory path 1618 to memory 1620, a point-to-point link to graphics accelerator 1612 (e.g. a Peripheral Component Interconnect express (PCIe) compliant fabric), a controller hub interconnect 1622, an I/O or other interconnect (e.g. USB, PCI, PCIe) for coupling the other illustrated components. Some examples of such components include the audio controller 1636, firmware hub (flash BIOS) 1628, wireless transceiver 1626, data storage 1624, legacy I/O controller 1610 containing user input and keyboard interfaces 1642, a serial expansion port 1638 such as Universal Serial Bus (USB), and a network controller 1634. The data storage device 1624 can comprise a hard disk drive, a floppy disk drive, a CD-ROM device, a flash memory device, or other mass storage device.

Figure 17:
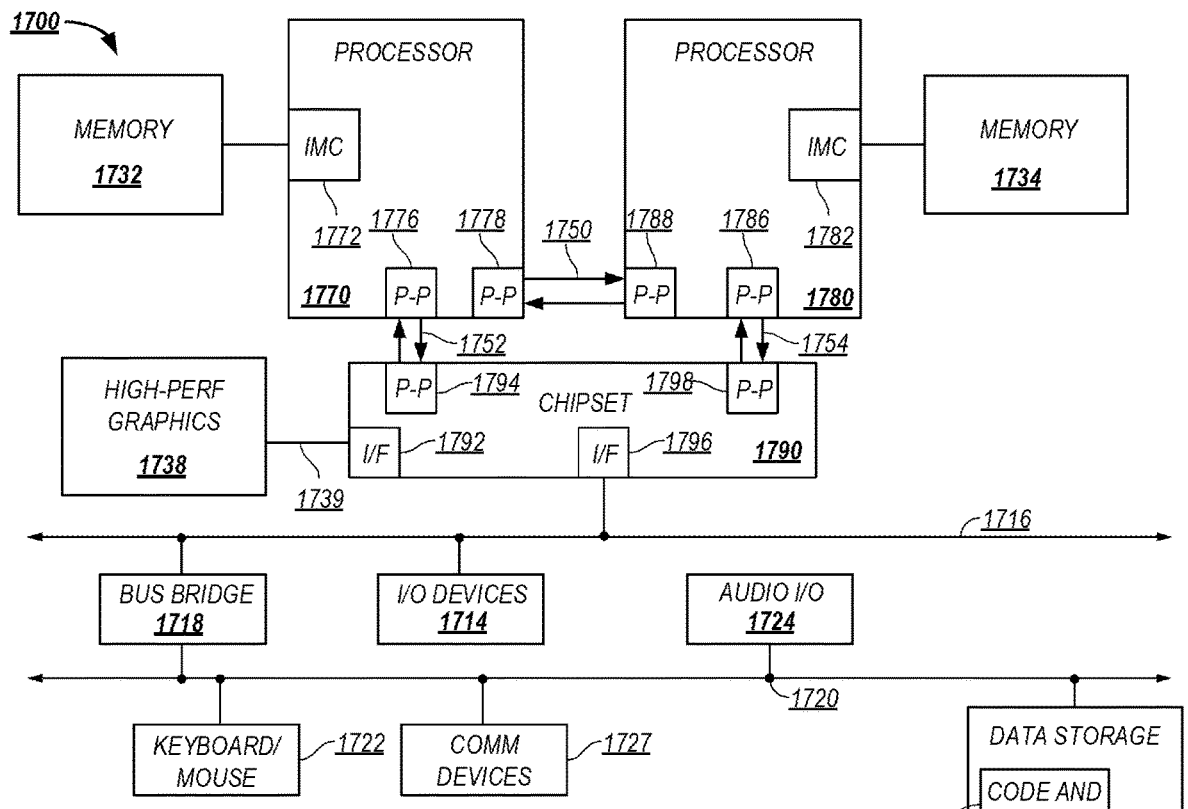
FIG. 17 illustrates an embodiment of a block for a computing system including multiple processors.

Referring now to FIG. 17, shown is a block diagram of a second system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of a processor. In one embodiment, 1752 and 1754 are part of a serial, point-to-point coherent interconnect fabric, such as a high-performance architecture. As a result, the invention may be implemented within the QPI architecture.

While shown with only two processors 1770, 1780, it is to be understood that the scope of the present invention is not so limited. In other embodiments, one or more additional processors may be present in a given processor.

Processors 1770 and 1780 are shown including integrated memory controller units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 each exchange information with a chipset 1790 via individual P-P interfaces 1752, 1754 using point to point interface circuits 1776, 1794, 1786, 1798. Chipset 1790 also exchanges information with a high-performance graphics circuit 1738 via an interface circuit 1792 along a high-performance graphics interconnect 1739.

A shared cache (not shown) may be included in either processor or outside of both processors; yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 are coupled to first bus 1716, along with a bus bridge 1718 which couples first bus 1716 to a second bus 1720. In one embodiment, second bus 1720 includes a low pin count (LPC) bus. Various devices are coupled to second bus 1720 including, for example, a keyboard and/or mouse 1722, communication devices 1727 and a storage unit 1728 such as a disk drive or other mass storage device which often includes instructions/code and data 1730, in one embodiment. Further, an audio I/O 1724 is shown coupled to second bus 1720. Note that other architectures are possible, where the included components and interconnect architectures vary. For example, instead of the point-to-point architecture of FIG. 17, a system may implement a multi-drop bus or other such architecture.

Figure 18:
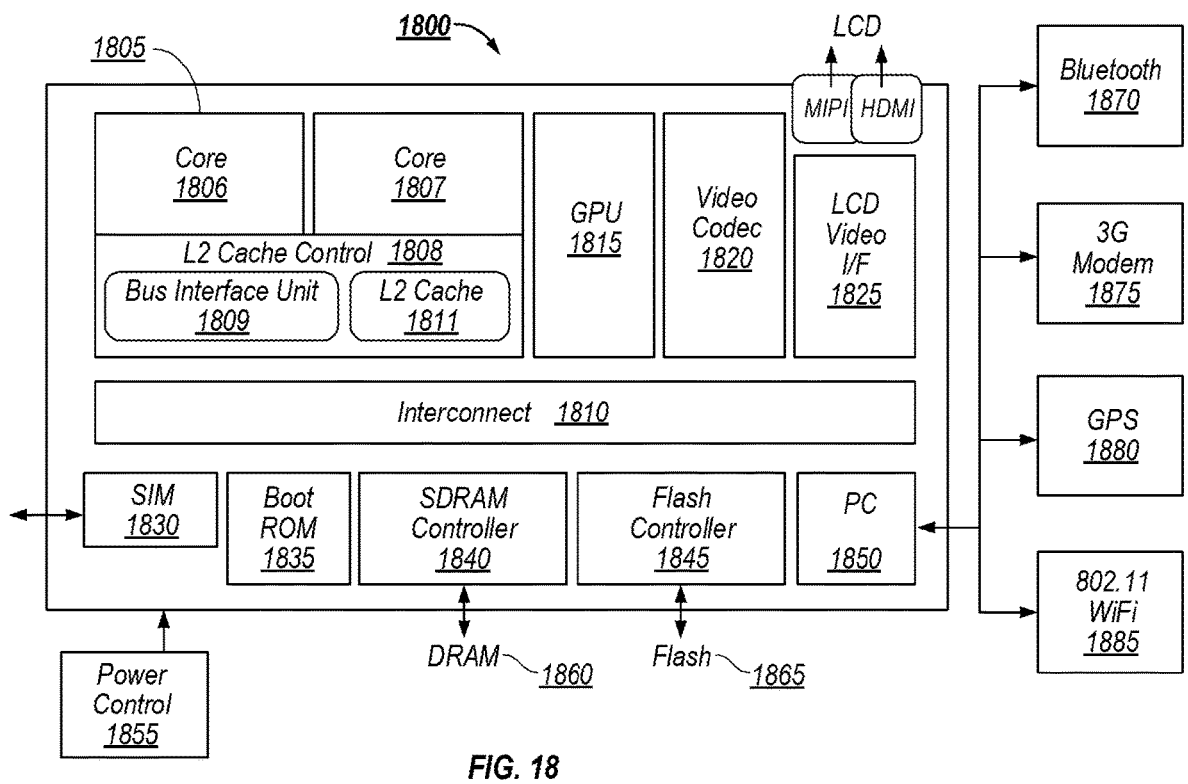
FIG. 18 illustrates an example system implemented as system on chip (SoC).

Turning next to FIG. 18, an embodiment of a system on-chip (SOC) design in accordance with the inventions is depicted. As a specific illustrative example, SOC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1800 includes 2 cores—1806 and 1807. Similar to the discussion above, cores 1806 and 1807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1811 to communicate with other parts of system 1800. Interconnect 1810 includes an on-chip interconnect, such as an IOSF, AMBA, or other interconnect discussed above, which potentially implements one or more aspects of described herein.

Interface 1810 provides communication channels to the other components, such as a Subscriber Identity Module (SIM) 1830 to interface with a SIM card, a boot ROM 1835 to hold boot code for execution by cores 1806 and 1807 to initialize and boot SOC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the invention described herein.

In addition, the system illustrates peripherals for communication, such as a Bluetooth module 1870, 3G modem 1875, GPS 1885, and WiFi 1885. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, an electronic device may be configured to perform one or more processes, techniques, and/or methods as described herein, or portions thereof. One such process is depicted in FIG. X-2. For example, the process may include performing, by a first and second retimer, an SKP adjustment during a first SKP ordered set (OS); and performing, by a third and fourth retimer, an SKP adjustment during a second SKP OS.

In some embodiments, an electronic device may be configured to perform one or more processes, techniques, and/or methods as described herein, or portions thereof. For example, the process may include enhancing a training ordered set (OS) to allow for five generations of speeds; and setting a configuration register to indicate a Gen 5 PCIe speed.

In some embodiments, an electronic device may be configured to perform one or more processes, techniques, and/or methods as described herein, or portions thereof. For example, the process may include identifying a channel type provided by a platform; identifying a presence of one or more retimers; and choosing, based on the channel type and whether one or more retimers are present, between 25 Gigatransfers per second (GT/s) and 32 GT/s.

In some embodiments, an electronic device may be configured to perform one or more processes, techniques, and/or methods as described herein, or portions thereof. For example, the process may include identifying a channel link width from a set that includes widths of ×20, ×24, ×28, and ×28; and communicating over a channel link based on the identified channel link width.

In some embodiments, an electronic device may be configured to perform one or more processes, techniques, and/or methods as described herein, or portions thereof. For example, the process may include identifying recovered clock data from clock data recovery (CDR); and transmitting, based on the recovered clock data, transmit (TX) data after an initial training.

In some embodiments, a method of communicating in accordance with a PCIe standard may be provided that includes performing, by a first and second retimer, an SKP adjustment during a first SKP ordered set (OS), and performing, by a third and fourth retimer, an SKP adjustment during a second SKP OS. The method can further include reducing a SKP OS frequency by half. In some cases, the first SKP OS may be sent back-to-back with the second SKP OS. The method may further include enhancing a training ordered set (OS) to allow for five generations of speeds, and setting a configuration register to indicate a Gen 5 PCIe speed. Further, a channel type provided by a platform may be identified, the presence of one or more retimers may be identified, and the channel speed may be selected (e.g., from either 25 Gigatransfers per second (GT/s) or 32 GT/s) based on the channel type and whether one or more retimers are present. This selection may also be determined based on whether forward error correction (FEC) is enabled or supported. This speed selection may take place during link training. These example methods may additional include identifying a channel link width from a set that includes widths of ×20, ×24, ×28, and ×28, and communicating over a channel link based on the identified channel link width. Further, recovered clock data from a clock data recovery component may be identified, and transmit data may be sent based on the recovered clock data following training of the link.

In some embodiments, an apparatus may be provided to communicate in accordance with a PCIe-based standard, the apparatus including an extended continuous time linear equalizer (CTLE), and/or minimum 8-tap decision feedback equalizer (DFE), and/or a T-coil or Pi-coil termination, and/or a data pattern filter related to clock data recovery (CDR), and/or a 4-way interleaved clock architecture, among other example features and components.

In some embodiments, an apparatus may be provided to communicate in accordance with a peripheral component interconnect express (PCIe) standard with channel loss characteristics, such as discussed above. The PCIe standard may be a Gen 5 (or higher) PCIe standard.

The following examples pertain to embodiments in accordance with this Specification. Example 1 is an apparatus including: a port to communicate with another device over a link, the port including: physical layer logic of a first protocol; link layer logic of each of a plurality of different protocols; and protocol negotiation logic to determine which of the plurality of different protocols to apply on the link. The protocol negotiation logic is to send and receive ordered sets in a configuration state of a link training state machine of the first protocol, where the ordered sets include an identifier of a particular one of the plurality of different protocols; and determine from the ordered sets that a link layer of the particular protocol is to be applied on the link.

Example 2 may include the subject matter of example 1, where the ordered sets include training sequences of a first type and training sequences of a second type, the training sequences of the first type are according to a first format, the training sequences of the second type are according to a second format, the second format defines one or more fields of the second type of training sequences to identify the particular protocol to apply to the link. The protocol negotiation logic is further to: identify entry into a first sub-state of the configuration link training state; identify in a training sequence of the first type sent in the first sub-state that the other device supports one or more protocols in the plurality of different protocols other than the first protocol; and cause training sequences of the second type to be sent in a second substrate of the configuration link training state based on identifying that the other device supports the one or more protocols.

Example 3 may include the subject matter of example 2, where training sequences of the first type lack fields to identify which of the plurality of protocols to apply to the link.

Example 4 may include the subject matter of any one of examples 2-3, where each of the trainings sequences of the first type and the training sequences of the second type include training sequences for use in a Peripheral Component Interconnect Express (PCIe)-based configuration link training state.

Example 5 may include the subject matter of example 4, where the other device is identified as supporting the one or more protocols based on a particular field defined according to the first format.

Example 6 may include the subject matter of example 5, where the particular field includes one or more bits in symbol 5 of the training sequence of the first type.

Example 7 may include the subject matter of any one of examples 4-6, where the one or more fields of the second type of training sequences are defined to include symbols 9 and of the second type of training sequences.

Example 8 may include the subject matter of any one of examples 2-7, where at least one of the second type of training sequences includes the identifier of the particular protocol.

Example 9 may include the subject matter of any one of examples 2-8, where first substrate includes a link width training substrate within the configuration state.

Example 10 may include the subject matter of any one of examples 2-9, where second substrate includes a lane numbering substrate within the configuration state.

Example 11 may include the subject matter of any one of examples 1-10, where the link layer of the particular protocol is determined to be applied to the link before exiting the configuration state.

Example 12 may include the subject matter of any one of examples 1-11, where the first protocol includes a PCIe-based protocol.

Example 13 may include the subject matter of example 12, where the plurality of different protocols includes the PCIe-based protocol.

Example 14 may include the subject matter of any one of examples 1-13, where the link layer of the particular protocol is to run on the logical physical layer (PHY) of the first protocol.

Example 15 is a method including: determining which of a plurality of different protocols to apply on the link, where the link is to use a physical layer of a first one of the plurality of different protocols. Determining the protocols to apply on the link includes: sending ordered sets in a configuration state of a link training state machine of the first protocol, where the ordered sets include an identifier of a particular one of the plurality of different protocols; and determining from the ordered sets that a link layer of the particular protocol is to be applied on the link.

Example 16 may include the subject matter of example 15, where the ordered sets include training sequences of a first type and training sequences of a second type, the training sequences of the first type are according to a first format, the training sequences of the second type are according to a second format, the second format defines one or more fields of the second type of training sequences to identify the particular protocol to apply to the link. Determining the protocols to apply may further include: identifying entry into a first sub-state of the configuration link training state; identifying in a training sequence of the first type sent in the first sub-state that the other device supports one or more protocols in the plurality of different protocols other than the first protocol; and causing training sequences of the second type to be sent in a second substrate of the configuration link training state based on identifying that the other device supports the one or more protocols.

Example 17 may include the subject matter of example 16, where training sequences of the first type lack fields to identify which of the plurality of protocols to apply to the link.

Example 18 may include the subject matter of any one of examples 16-17, where each of the trainings sequences of the first type and the training sequences of the second type include training sequences for use in a Peripheral Component Interconnect Express (PCIe)-based configuration link training state.

Example 19 may include the subject matter of example 18, where the other device is identified as supporting the one or more protocols based on a particular field defined according to the first format.

Example 20 may include the subject matter of example 19, where the particular field includes one or more bits in symbol 5 of the training sequence of the first type.

Example 21 may include the subject matter of any one of examples 18-20, where the one or more fields of the second type of training sequences are defined to include symbols 9 and 10 of the second type of training sequences.

Example 22 may include the subject matter of any one of examples 16-21, where at least one of the second type of training sequences includes the identifier of the particular protocol.

Example 23 may include the subject matter of any one of examples 16-22, where first substrate includes a link width training substrate within the configuration state.

Example 24 may include the subject matter of any one of examples 16-23, where second substrate includes a lane numbering substrate within the configuration state.

Example 25 may include the subject matter of any one of examples 15-24, where the link layer of the particular protocol is determined to be applied to the link before exiting the configuration state.

Example 26 may include the subject matter of any one of examples 15-25, where the first protocol includes a PCIe-based protocol.

Example 27 may include the subject matter of example 27, where the plurality of different protocols includes the PCIe-based protocol.

Example 28 may include the subject matter of any one of examples 15-27, where the link layer of the particular protocol is to run on the logical physical layer (PHY) of the first protocol.

Example 29 is a system including means to perform the method of any one of examples 15-28.

Example 30 may include the subject matter of example 29, where the means include a computer-readable storage medium storing instructions executable by a data processing apparatus to perform at least a portion of the method of any one of examples 15-28.

Example 31 may include the subject matter of any one of examples 29-30, where the means further include hardware circuitry to perform at least a portion of the method of any one of examples 15-28.

Example 32 is an apparatus including: a port to communicate with another device over a link, the port including: physical layer logic of a first protocol; link layer logic of each of a plurality of different protocols; and protocol negotiation logic to determine which of the plurality of different protocols to apply on the link. The protocol negotiation logic is to: receive ordered sets from the other device, where the ordered sets are encoded to identify a particular one of the plurality of protocols supported by the other device; and cause the particular protocol to be applied on the link based on the ordered sets.

Example 33 may include the subject matter of example 32, where the ordered sets include a user-definable message field and the particular protocol is to be identified within the user-definable message field.

Example 34 may include the subject matter of example 33, where the ordered sets include SKP ordered sets and the user-definable message field includes a vendor defined message field.

Example 35 may include the subject matter of example 34, where a particular symbol is encoded to identify that an immediately adjacent symbol includes the vendor-defined message field.

Example 36 may include the subject matter of any one of examples 33-35, where the ordered sets are defined according to a Peripheral Component Interconnect Express (PCIe)-based protocol.

Example 37 may include the subject matter of any one of examples 32-36, where the protocol negotiation logic is further to determine whether the other device supports the ordered sets.

Example 38 may include the subject matter of example 37, where the protocol negotiation logic, based on determining that the other device does not support the ordered sets, is to read a configuration register to determine whether other protocols are to be applied to the link.

Example 39 may include the subject matter of any one of examples 37-38, where the protocol negotiation logic is to cause only the first protocol to be applied on the link based at least in part on determining that the other device does not support the ordered sets.

Example 40 is a method including: determining which of the plurality of different protocols to apply on the link, where the link is to use a physical layer of a first one of the plurality of different protocols. Determining the protocols to apply on the link includes: receiving ordered sets from the other device, wherein the ordered sets are encoded to identify a particular one of the plurality of protocols supported by the other device; and causing the particular protocol to be applied on the link based on the ordered sets.

Example 41 may include the subject matter of example 40, where the ordered sets include a user-definable message field and the particular protocol is to be identified within the user-definable message field.

Example 42 may include the subject matter of example 41, where the ordered sets include SKP ordered sets and the user-definable message field includes a vendor defined message field.

Example 43 may include the subject matter of example 42, where a particular symbol is encoded to identify that an immediately adjacent symbol includes the vendor-defined message field.

Example 44 may include the subject matter of any one of examples 41-43, where the ordered sets are defined according to a Peripheral Component Interconnect Express (PCIe)-based protocol.

Example 45 may include the subject matter of any one of examples 40-44, where the protocol negotiation logic is further to determine whether the other device supports the ordered sets.

Example 46 may include the subject matter of example 45, where the protocol negotiation logic, based on determining that the other device does not support the ordered sets, is to read a configuration register to determine whether other protocols are to be applied to the link.

Example 47 may include the subject matter of any one of examples 45-46, where the protocol negotiation logic is to cause only the first protocol to be applied on the link based at least in part on determining that the other device does not support the ordered sets.

Example 48 is a system including means to perform the method of any one of examples 40-47.

Example 49 may include the subject matter of example 48, where the means include a computer-readable storage medium storing instructions executable by a data processing apparatus to perform the method of any one of examples 40-47.

Example 50 may include the subject matter of any one of examples 48-49, where the means further include hardware circuitry to perform at least a portion of the method of any one of examples 40-47.

Example 51 is a system including: a first device; and a second device to connect to the first device over a link. The second device includes: a processor; physical layer logic of a first protocol; link layer logic of each of a plurality of different protocols; and protocol negotiation logic to determine which of the plurality of different protocols to apply on the link. The protocol negotiation logic is to: send training data to the first device during one or more link training states for the link, where link training states include link training states of the first protocol, the training data is encoded to identify that the second device supports at least one of the plurality of protocols other than the first protocol; receive training data from the first device during the link training states, where the training data received from the first device is encoded to identify a particular one of the plurality of protocols; and cause the particular protocol to be applied to the link based on the training data.

Example 52 may include the subject matter of example 51, where the training data includes training sequences of a first type including one or more bits to identify whether each of the first and second devices supports the one or more protocols, and the training data further includes training sequences of a second type including one or more symbols to identify protocols supported by the devices.

Example 53 may include the subject matter of example 52, where the training sequences of the first type are to be sent in a first substrate of a particular link training state and the training sequences of the second type are to be sent in a second substrate of the particular link training state.

Example 54 may include the subject matter of example 53, where the particular link training state includes a configuration link training state.

Example 55 may include the subject matter of any one of examples 51-54, where the training data is sent during a configuration link training state of the first protocol.

Example 56 may include the subject matter of any one of examples 51-55, where the first protocol includes a Peripheral Component Interconnect Express (PCIe)-based protocol.

Example 57 may include the subject matter of any one of examples 51-56, where the training data includes a SKP ordered set.

Example 58 may include the subject matter of example 57, where the SKP ordered set includes a vendor defined message symbol and the particular protocol is to be identified in the vendor defined message symbol.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a port to couple to a device over an interconnect, wherein the port comprises:
 protocol circuitry to support negotiation of an alternate protocol during training of a link on the interconnect, wherein a physical layer of the link is to be based on a Peripheral Component Interconnect Express (PCIe) protocol, the alternate protocol comprises a non-PCIe protocol, and the protocol circuitry is to:
  receive a training set 1 (TS1) ordered set from the device over the interconnect, wherein the TS1 ordered set indicates support for negotiation of the alternate protocol;
  receive a first modified TS1 ordered set over the interconnect, wherein the first modified TS1 ordered set requests whether the alternate protocol is supported and comprises a field to indicate details of the alternate protocol; and
  send a second modified TS1 ordered set to the device over the interconnect, wherein the second modified TS1 ordered set confirms that the alternate protocol is supported.

2. The apparatus of claim 1, wherein the port comprises an upstream port to communicate with a downstream port of the device.

3. The apparatus of claim 1, wherein the first modified TS1 ordered set comprises a first instance of a TS1 ordered set defined by the PCIe protocol and the second modified TS1 comprises a second instance of the TS1 ordered set.

4. The apparatus of claim 1, wherein protocol circuitry is to further receive a modified training set 2 (TS2) ordered set during the negotiation of the alternate protocol.

5. The apparatus of claim 1, wherein the protocol circuitry comprises multiplexing of a plurality protocols over the PHY, wherein the plurality of protocols comprises the alternate protocol.

6. The apparatus of claim 1, wherein the protocol circuitry is further to enter an active link state and communicate with the device in the active link state according to the alternate protocol.

7. The apparatus of claim 1, wherein the training of the link is based on the PCIe protocol.

8. The apparatus of claim 1, wherein the negotiation of the alternate protocol is to be completed in a configuration state of the training of the link.

9. The apparatus of claim 8, wherein the configurations state comprises a plurality of configuration substrates.

10. The apparatus of claim 9, wherein the alternate protocol negotiation takes place during a subset of the configuration substrates and the plurality of configuration substrates comprise Configuration.Linkwidth.Start, Configuration.Linkwidth.Accept, Configuration.Lanenum.Wait, Configuration.Lanenum.Accept, Configuration.Complete, and Configuration.Idle.

11. The apparatus of claim 10, wherein the subset of configuration substrates comprise Configuration.Lanenum.Wait, Configuration.Lanenum.Accept, and Configuration.Complete.

12. The apparatus of claim 1, wherein the protocol circuitry is further to determine whether the alternative protocol is supported based on a value in a capabilities register.

13. An apparatus comprising:
a port to couple to a device over an interconnect, wherein the port comprises:
 protocol circuitry to support negotiation of an alternate protocol during training of a link on the interconnect, wherein a physical layer of the link is to be based on a Peripheral Component Interconnect Express (PCIe) protocol, the alternate protocol comprises a non-PCIe protocol, and the protocol circuitry is to:
  send a first instance of a training set 1 (TS1) ordered set to the device over the interconnect, wherein the first instance of the TS1 ordered set indicates support for negotiation of the alternate protocol;
  receive a second instance of the TS1 ordered set from the device over the interconnect, wherein the second instance of the TS1 ordered set indicates that negotiation of the alternate protocol is supported by the device;
  send a first instance of a modified TS1 ordered set over the interconnect, wherein the first modified TS1 Ordered set requests whether the alternate protocol is supported by the device and comprises a field to indicate details of the alternate protocol; and receive a second instance of a modified TS1 ordered set to the device over the interconnect, wherein the second modified TS1 ordered set confirms that the alternate protocol is supported and comprises a field to identify the alternate protocol.

14. The apparatus of claim 13, wherein the port comprises a downstream port to communicate with an upstream port of the device.

15. The apparatus of claim 14, wherein the device comprises a root port.

16. The apparatus of claim 13, wherein the TS1 ordered set and the first and second instances of the modified TS1 ordered are defined by the PCIe protocol.

17. The apparatus of claim 13, wherein the negotiation of the alternate protocol is to be completed in a configuration state of the link training.

18. A method comprising:
receiving, at a first device, a training set 1 (TS1) ordered set from a second device, wherein the first device is coupled to the second device over an interconnect, wherein the TS1 ordered set indicates support for alternate protocol negotiation, the TS1 ordered set is received during training of a link on the interconnect according to a Peripheral Component Interconnect Express (PCIe) protocol, and the link is to comprise a PCIe physical layer;
receiving a first modified TS1 ordered set at the first device from the second device during the training of the link, wherein the first modified TS1 Ordered set requests whether a particular alternate protocol is supported by the first device and comprises a field to indicate details of the particular alternate protocol, wherein the particular alternate protocol comprises a non-PCIe protocol;
sending a second modified TS1 ordered set from the first device to the second device during the training of the link, wherein the second modified TS1 ordered set indicates that the particular alternate protocol is supported by the first device;
receiving another ordered set from the second device at the first device during the training of the link to confirm that the particular alternate protocol is to apply to communication on the link; and
entering an active link state on the link based on the training of the link, wherein the particular alternative protocol is used during the active link state.

19. A method comprising:
sending a first instance of a training set 1 (TS1) ordered set from a first device to a second device over an interconnect, wherein the interconnect couples the first device to the second device, the first instance of the TS1 ordered set is sent during training of a link on the interconnect and indicates support for alternate protocol negotiation, the training of the link is based on a Peripheral Component Interconnect Express (PCIe)-based protocol, and the link is to have a PCIe physical layer (PHY);
receiving a second instance of the TS1 ordered set from the second device at the first device during the training of the link, wherein the second instance of the TS1 ordered set indicates that the alternate protocol negotiation is supported by the second device;
sending a first modified TS1 ordered set from the first device to the second device during the training of the link, wherein the first modified TS1 Ordered set requests whether a particular alternate protocol is supported by the second device and comprises a field to indicate details of the alternate protocol, wherein the particular alternate protocol comprises a non-PCIe protocol;
receiving a second modified TS1 ordered set from the first device at the second device during the training of the link, wherein the second modified TS1 ordered set indicates that the alternate protocol is supported by the second device and comprises a field to identify the alternate protocol; and
entering an active link state following the training of the link, wherein the particular alternative protocol is used during the active link state.

20. A system comprising:
a first device; and
a second device coupled to the first device by an interconnect,
wherein the first device comprises protocol circuitry a port to couple to a device over an interconnect, wherein the port comprises:
protocol circuitry to support negotiation of an alternate protocol during training of a link on the interconnect, wherein a physical layer of the link is to be based on a Peripheral Component Interconnect Express (PCIe) protocol, the alternate protocol comprises a non-PCIe protocol, and the protocol circuitry is to:
receive a training set 1 (TS1) ordered set from the first device over the interconnect, wherein the modified TS1 ordered set indicates support for negotiation of the alternate protocol;
receive a first modified TS1 ordered set from the first device over the interconnect, wherein the first modified TS1 Ordered set requests whether the alternate protocol is supported and comprises a field to indicate details of the alternate protocol; and
send a second modified TS1 ordered set to the first device over the interconnect, wherein the second modified TS1 ordered set confirms that the alternate protocol is supported; and
receive another ordered set from the first device over the interconnect to confirm that the alternate protocol is to apply to communication on the interconnect.

21. The system of claim 20, further comprising a retimer device positioned on the link between the first device and the second device on the link, wherein one of the first modified TS1 ordered set or the second modified TS1 ordered set identifies presence of the retimer device on the link.

22. The system of claim 20, wherein the first device comprises a processor device.

23. The system of claim 20, wherein the first device comprises a memory device.

* * * * *